United States Patent
Park et al.

(10) Patent No.: US 11,627,021 B2
(45) Date of Patent: *Apr. 11, 2023

(54) DATA PROCESSING DEVICE AND MEMORY SYSTEM INCLUDING THE SAME

(71) Applicant: SAMSUNG ELECTRONICS CO., LTD., Suwon-si (KR)

(72) Inventors: Jaewoo Park, Yongin-si (KR); Youngdon Choi, Seoul (KR); Junghwan Choi, Hwaseong-si (KR); Changsik Yoo, Seoul (KR)

(73) Assignees: Samsung Electronics Co., Ltd., Suwon-Si (KR); IUCF-HYU (Industry-University Cooperation Foundation Hanyang University, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,406

(22) Filed: Dec. 28, 2021

(65) Prior Publication Data

US 2022/0123967 A1 Apr. 21, 2022

Related U.S. Application Data

(63) Continuation of application No. 17/156,813, filed on Jan. 25, 2021, now Pat. No. 11,218,343.

(30) Foreign Application Priority Data

Jun. 2, 2020 (KR) ........................ 10-2020-0066716

(51) Int. Cl.
*H04L 25/02* (2006.01)
*H04L 25/14* (2006.01)
*H04L 25/49* (2006.01)

(52) U.S. Cl.
CPC .......... *H04L 25/0272* (2013.01); *H04L 25/14* (2013.01); *H04L 25/4917* (2013.01)

(58) Field of Classification Search
CPC . H04L 25/14; H04L 25/0264; H04L 25/0272; H04L 25/0274; H04L 25/028;
(Continued)

(56) References Cited

U.S. PATENT DOCUMENTS 7,495,587 B2 * 2/2009 Bae ...................... G11C 7/1006
341/55
7,936,289 B2 * 5/2011 Bae ...................... H03M 5/145
341/51

(Continued)

FOREIGN PATENT DOCUMENTS

TW 202001686 A 1/2020
TW I720595 3/2021
TW I748266 12/2021

OTHER PUBLICATIONS

Taiwanese Notice of Allowance dated Jan. 4, 2022.

*Primary Examiner* — James M Perez
(74) *Attorney, Agent, or Firm* — Lee IP Law, P.C.

(57) ABSTRACT

Provided are a memory device and a memory system including the same. The memory device may include a data bus inversion (DBI) mode selector configured to select a first multi-bit DBI signal from among a plurality of multi-bit DBI signals respectively corresponding to a plurality of DBI modes according to multi-bit data; a multi-mode DBI encoder configured to generate encoded multi-bit data by DBI encoding the multi-bit data according to the first multi-bit DBI signal; and a transceiver configured to transmit a data symbol corresponding to the encoded multi-bit data through a data channel and transmit a DBI symbol corresponding to the first multi-bit DBI signal through a DBI channel.

20 Claims, 15 Drawing Sheets

(58) Field of Classification Search
CPC ............ H04L 25/0284; H04L 25/0292; H04L 25/0296; H04L 25/491; H04L 25/4917
See application file for complete search history.

(56) References Cited

U.S. PATENT DOCUMENTS

| | | | | |
|---|---|---|---|---|
| 8,552,891 | B2* | 10/2013 | Bae | H03K 19/00346 341/67 |
| 8,581,755 | B2* | 11/2013 | Abbasfar | G06F 13/4072 714/809 |
| 8,832,391 | B2* | 9/2014 | Choi | G06F 13/1668 711/170 |
| 8,942,309 | B1* | 1/2015 | Ware | H04L 25/14 375/220 |
| 9,048,855 | B2* | 6/2015 | Bae | H03M 5/00 |
| 9,070,467 | B2* | 6/2015 | Kim | G11C 11/1675 |
| 9,148,170 | B2* | 9/2015 | Hollis | H03M 5/02 |
| 9,252,802 | B2* | 2/2016 | Hollis | G06F 13/4221 |
| 9,275,700 | B2* | 3/2016 | Ku | G11C 7/1087 |
| 9,614,698 | B2* | 4/2017 | Song | H04B 1/04 |
| 9,953,702 | B2* | 4/2018 | Son | G11C 7/18 |
| 9,959,935 | B2* | 5/2018 | Kang | G11C 29/1201 |
| 10,204,670 | B2* | 2/2019 | Kim | G11C 11/1693 |
| 10,297,294 | B2* | 5/2019 | Hollis | G11C 7/1006 |
| 10,331,205 | B2* | 6/2019 | Kim | G06F 3/147 |
| 10,476,529 | B2* | 11/2019 | Cha | H03M 13/2906 |
| 10,491,238 | B2* | 11/2019 | Sudhakaran | H03M 5/145 |
| 10,594,337 | B2* | 3/2020 | Sudhakaran | H03M 5/145 |
| 10,692,555 | B2* | 6/2020 | Oh | G11C 11/4076 |
| 10,747,695 | B2* | 8/2020 | Ho | G11C 7/1006 |
| 10,769,010 | B2* | 9/2020 | Son | G11C 11/4093 |
| 10,832,632 | B2* | 11/2020 | Amirkhany | G09G 5/006 |
| 10,846,169 | B2* | 11/2020 | Cha | G11C 29/52 |
| 10,860,087 | B2* | 12/2020 | Kim | G06F 3/0416 |
| 11,036,578 | B2* | 6/2021 | Kim | G06F 11/1048 |
| 11,159,153 | B2* | 10/2021 | Lee | H04B 14/023 |
| 11,218,343 | B2* | 1/2022 | Park | H04L 25/0272 |
| 11,353,707 | B2* | 6/2022 | Kim | G06F 3/0346 |
| 2002/0191707 | A1* | 12/2002 | Lee | G06F 13/4072 375/295 |
| 2007/0115733 | A1* | 5/2007 | Jang | G11C 7/1051 365/189.07 |
| 2007/0242508 | A1* | 10/2007 | Bae | G11C 7/1006 365/184 |
| 2007/0290902 | A1* | 12/2007 | Bae | H03K 19/00346 341/101 |
| 2008/0069145 | A1* | 3/2008 | Chung | H04L 25/4915 370/476 |
| 2011/0025533 | A1* | 2/2011 | Abbasfar | H04L 25/14 341/63 |
| 2011/0153939 | A1* | 6/2011 | Choi | G11C 11/401 711/E12.002 |
| 2011/0222623 | A1* | 9/2011 | Hollis | H04L 25/0278 375/295 |
| 2012/0206280 | A1* | 8/2012 | Abbasfar | G06F 13/4204 341/51 |
| 2013/0061102 | A1* | 3/2013 | Sohn | G11C 7/1063 714/718 |
| 2013/0307708 | A1* | 11/2013 | Hollis | H03M 5/20 341/56 |
| 2014/0281075 | A1* | 9/2014 | Hollis | G06F 13/4286 710/106 |
| 2015/0146816 | A1* | 5/2015 | Hollis | H04L 25/4915 375/288 |
| 2015/0212156 | A1* | 7/2015 | Bourstein | H04L 1/0042 714/744 |
| 2015/0229325 | A1* | 8/2015 | Hollis | H04L 25/4917 710/106 |
| 2016/0006587 | A1* | 1/2016 | Hollis | H03M 5/02 375/288 |
| 2016/0013958 | A1* | 1/2016 | Mishra | H04L 25/06 375/287 |
| 2016/0109937 | A1* | 4/2016 | Kim | G06F 3/0482 345/156 |
| 2016/0147481 | A1* | 5/2016 | Best | G11C 7/1006 711/105 |
| 2016/0179377 | A1* | 6/2016 | Yoon | G06F 3/061 711/154 |
| 2017/0212695 | A1* | 7/2017 | Hollis | G06F 3/0635 |
| 2018/0095925 | A1* | 4/2018 | Iyer | G06F 13/4265 |
| 2018/0143922 | A1* | 5/2018 | Hong | G11C 7/222 |
| 2019/0129877 | A1* | 5/2019 | Ho | G06F 9/44505 |
| 2019/0229749 | A1* | 7/2019 | Sudhakaran | H03M 5/145 |
| 2019/0265780 | A1* | 8/2019 | Kim | G06V 10/40 |
| 2019/0303339 | A1* | 10/2019 | Lee | H04L 1/0042 |
| 2019/0305765 | A1* | 10/2019 | Lee | H04L 27/04 |
| 2019/0305995 | A1* | 10/2019 | Lee | H04B 3/32 |
| 2019/0361835 | A1* | 11/2019 | Ebihara | G11C 7/1006 |
| 2019/0386677 | A1* | 12/2019 | Sudhakaran | H03M 7/46 |
| 2020/0028708 | A1* | 1/2020 | Wilson | G06F 13/4027 |
| 2021/0048678 | A1* | 2/2021 | Kim | G06T 19/006 |
| 2021/0182223 | A1* | 6/2021 | Choi | G11C 7/02 |
| 2021/0193245 | A1* | 6/2021 | Ryu | G11C 7/1057 |
| 2021/0377080 | A1* | 12/2021 | Park | H04L 25/14 |
| 2022/0068331 | A1* | 3/2022 | Lee | G06F 13/1668 |
| 2022/0075725 | A1* | 3/2022 | Jin | G11C 7/1069 |
| 2022/0123967 | A1* | 4/2022 | Park | H04L 25/14 |
| 2022/0173827 | A1* | 6/2022 | Brox | H04L 1/0003 |
| 2022/0269089 | A1* | 8/2022 | Kim | G06V 10/751 |
| 2022/0294476 | A1* | 9/2022 | Seol | H03M 13/611 |
| 2022/0294554 | A1* | 9/2022 | Seol | H04L 1/0045 |

\* cited by examiner

PAM-4 case

| DATA | '00' | '01' | '10' | '11' |
|---|---|---|---|---|
| SYMBOL | 0 | 1 | 2 | 3 |
| TX config | VDD—∞—•—R∥R—↓ | VDD—3R—•—1.5R∥R—↓ | VDD—1.5R—•—3R∥R—↓ | VDD—R—•—∞∥R—↓ |
| DC current | 0VDD | 5/18VDD | 8/18VDD | 9/18VDD |
| COST | 0 | 5 | 8 | 9 |

| DBI MODE | DBI_SB | DBI_MD[1:0] | INVERSION SCHEME |
|---|---|---|---|
| MD0 | 0 | 00 | Do not invert |
| MD1 | 1 | 01 | Invert only bit[0] |
| MD2 | 2 | 10 | Invert only bit[1] |
| MD3 | 3 | 11 | Invert bit[1] and bit[0] (all bit) |

| DATA0 | DBI_MD | E_DATA0 |
|---|---|---|
| 00 | 00 | 00 |
| 01 | 01 | 00 |
| 10 | 10 | 00 |
| 11 | 11 | 00 |

| DATA0 | DATA1 | D_SB | | COST |
|---|---|---|---|---|
| | | D_SB0 | D_SB1 | |
| 00 | 00 | 0 | 0 | 0 |
| 01 | 01 | 1 | 1 | 10 |
| 10 | 10 | 2 | 2 | 16 |
| 11 | 11 | 3 | 3 | 18 |
| ... | ... | ... | ... | ... |

| DATA0 | DATA1 | D_SB | | DBI_SB | COST |
|---|---|---|---|---|---|
| | | D_SB0 | D_SB1 | | |
| 00 | 00 | 0 | 0 | 0 | 0 |
| 01 | 01 | 0 | 0 | 1 | 5 |
| 10 | 10 | 0 | 0 | 2 | 8 |
| 11 | 11 | 0 | 0 | 3 | 9 |
| ... | ... | ... | ... | ... | ... |

FIG. 10

| CASE | DATA PATTERN COUNT | | | | COST | | | | MIN_COST | DBLSB |
|---|---|---|---|---|---|---|---|---|---|---|
| | CNT0 ("00" count) | CNT1 ("01" count) | CNT2 ("10" count) | CNT3 ("11" count) | DBL_MD0 (00) | DBL_MD1 (01) | DBL_MD2 (10) | DBL_MD3 (11) | | |
| CASE 0 | 0 | 0 | 0 | 8 | 72 | 69 | 48 | 9 | 9 | 3 |
| CASE 1 | 0 | 0 | 8 | 0 | 64 | 77 | 8 | 49 | 8 | 2 |
| CASE 2 | 0 | 8 | 0 | 0 | 40 | 5 | 80 | 73 | 5 | 1 |
| CASE 3 | 8 | 0 | 0 | 0 | 0 | 45 | 72 | 81 | 0 | 0 |
| CASE 4 | 1 | 0 | 0 | 7 | 63 | 66 | 51 | 18 | 18 | 3 |
| CASE 5 | 0 | 1 | 7 | 0 | 61 | 68 | 17 | 52 | 17 | 2 |
| CASE 6 | 0 | 7 | 1 | 0 | 43 | 14 | 71 | 70 | 14 | 1 |
| CASE 7 | 7 | 1 | 0 | 0 | 5 | 40 | 73 | 80 | 5 | 0 |
| ... | ... | ... | ... | ... | ... | ... | ... | ... | ... | ... |

FIG. 12

| DBI MODE | DBI_SB | DBI_MD[2:0] | INVERSION SCHEME |
|---|---|---|---|
| MD0 | 0 | 000 | Do not invert |
| MD1 | 1 | 001 | Invert only bit[0] |
| MD2 | 2 | 010 | Invert only bit[1] |
| MD3 | 3 | 011 | Invert bit[1] and bit[0] |
| MD4 | 4 | 100 | Invert only bit[2] |
| MD5 | 5 | 101 | Invert bit[2] and bit[0] |
| MD6 | 6 | 110 | Invert bit[2] and bit[1] |
| MD7 | 7 | 111 | Invert bit[2], bit[1] and bit[0] (all bit) |

DATA PROCESSING DEVICE AND MEMORY SYSTEM INCLUDING THE SAME

CROSS-REFERENCE TO RELATED APPLICATIONS

This application is a continuation of pending U.S. application Ser. No. 17/156,813, filed on Jan. 25, 2021, the entire contents of which is hereby incorporated by reference.

Korean Patent Application No. 10-2020-0066716, filed on Jun. 2, 2020, in the Korean Intellectual Property Office, and entitled: "Memory Device and Memory System Including the Same," is incorporated by reference herein in its entirety.

BACKGROUND

1. Field

Embodiments relate to a memory device, and more particularly, to a memory device and a memory system including the memory device.

2. Description of the Related Art

A memory system may include a transmitting device and a receiving device, and the transmitting device and the receiving device may transmit and receive data through a plurality of data channels. To reduce power consumption for transmission and reception of data, a data encoding method like data bus inversion (DBI) may be used. In detail, a transmitting device may generate transmission data by selectively inverting at least some bits of data by using the DBI encoding method, and may transmit a DBI signal indicating that the at least some bits of the data are inverted together with the transmission data, which may help to reduce the overall power consumption for data transmission.

SUMMARY

Embodiments are directed to a memory device, including a data bus inversion (DBI) mode selector configured to select a first multi-bit DBI signal from among a plurality of multi-bit DBI signals respectively corresponding to a plurality of DBI modes according to multi-bit data; a multi-mode DBI encoder configured to generate encoded multi-bit data by DBI encoding the multi-bit data according to the first multi-bit DBI signal; and a transceiver configured to transmit a data symbol corresponding to the encoded multi-bit data through a data channel and transmit a DBI symbol corresponding to the first multi-bit DBI signal through a DBI channel.

Embodiments are also directed to a memory device, including a transceiver configured to receive a data symbol and a data bus inversion (DBI) symbol through a data channel and a DBI channel, respectively, generate encoded multi-bit data from the received data symbol, and generate a multi-bit DBI signal from the received DBI symbol; and a multi-mode DBI decoder configured to generate multi-bit data by DBI decoding the encoded multi-bit data according to the multi-bit DBI signal.

Embodiments are also directed to a memory system, including a transmitting device configured to data bus inversion (DBI) encode a plurality of pieces of multi-bit data according to a multi-bit DBI signal, transmit a plurality of data symbols corresponding to a plurality of pieces of encoded multi-bit data through a plurality of data channels, and transmit a DBI symbol corresponding to the multi-bit DBI signal through a DBI channel; and a receiving device configured to receive the plurality of data symbols through the plurality of data channels, receive the DBI symbol through the DBI channel, and DBI decode the plurality of pieces of the multi-bit data from the plurality of data symbols according to the multi-bit DBI signal.

Embodiments are also directed to a computing system, including a processor; and a memory configured to communicate with the processor through a plurality of data channels and at least one data bus inversion (DBI) channel. Data symbols corresponding to multi-bit data may be transmitted and received through the plurality of data channels, respectively, a DBI symbol corresponding to a multi-bit DBI signal indicating one from among a plurality of DBI modes may be transmitted and received through the at least one DBI channel, and the multi-bit data may be DBI encoded according to the multi-bit DBI signal.

Embodiments are also directed to a memory device, including a data bus inversion (DBI) mode selector configured to select a 2-bit DBI signal corresponding to one of four DBI modes according to 2-bit data; a DBI encoder configured to generate encoded 2-bit data by DBI encoding the 2-bit data according to the selected 2-bit DBI signal; and a transceiver configured to transmit a data symbol corresponding to the encoded 2-bit data through a data channel and transmit a DBI symbol corresponding to the 2-bit DBI signal through a DBI channel.

Embodiments are also directed to a memory system, including a transmitting device configured to data bus inversion (DBI) encode a plurality of pieces of 2-bit data according to a 2-bit DBI signal, transmit a plurality of data symbols corresponding to a plurality of pieces of encoded 2-bit data through a plurality of data channels, and transmit a DBI symbol corresponding to the 2-bit DBI signal through a DBI channel; and a receiving device configured to receive the plurality of data symbols through the plurality of data channels, receive the DBI symbol through the DBI channel, and DBI decode the 2-bit data from the plurality of data symbols according to the 2-bit DBI signal.

BRIEF DESCRIPTION OF THE DRAWINGS

Features will become apparent to those of skill in the art by describing in detail example embodiments with reference to the attached drawings in which:

FIG. 10 is a table showing an example of the operation of the DBI mode selector shown in FIG. 9;

FIG. 12 is a table showing an example of a plurality of DBI modes according to the example embodiment of FIG. 11;

DETAILED DESCRIPTION

Figure 1:
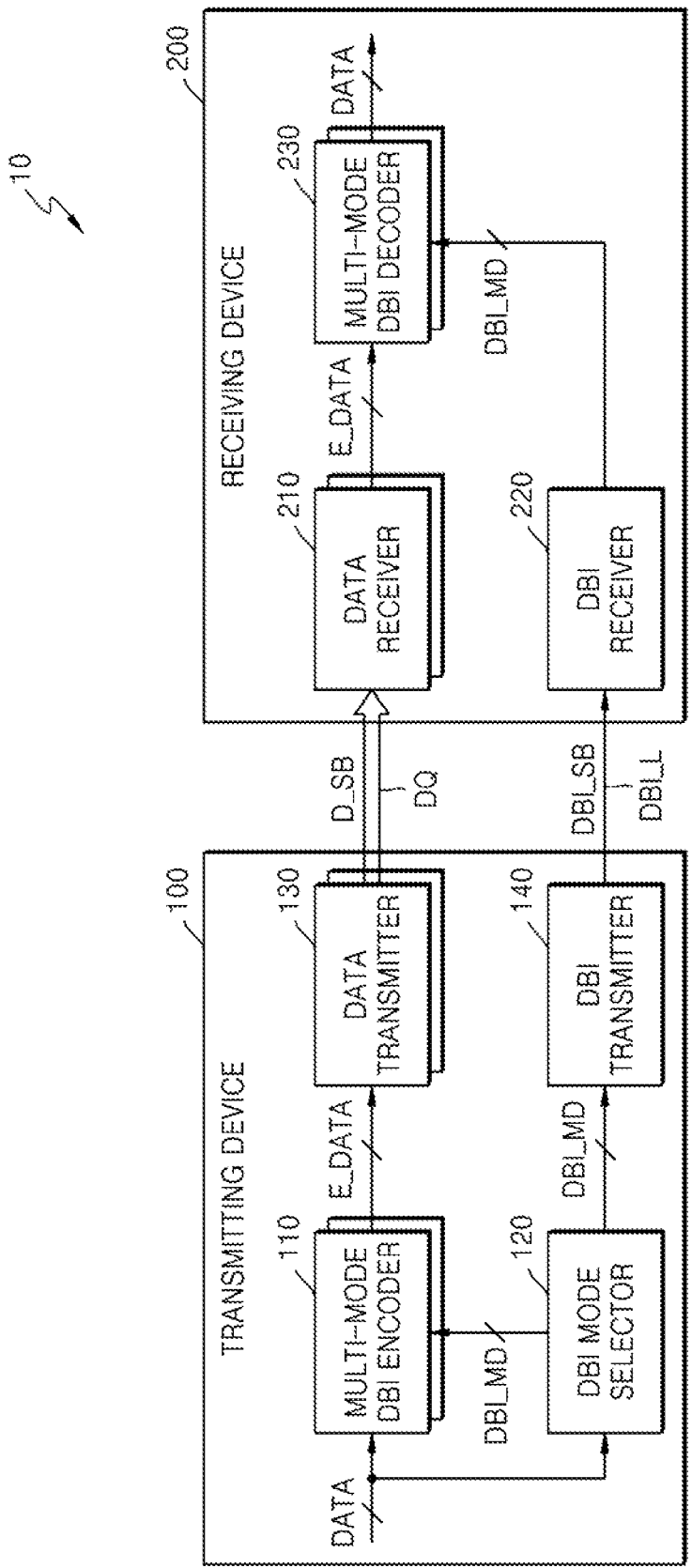
FIG. 1 is a block diagram showing a memory system according to an example embodiment.

FIG. 1 is a block diagram showing a memory system 10 according to an example embodiment.

Referring to FIG. 1, the memory system 10 may include a transmitting device 100 and a receiving device 200. The transmitting device 100 may include a multi-mode DBI encoder 110, a DBI mode selector 120, a data transmitter 130, and a DBI transmitter 140. The receiving device 200 may include a data receiver 210, a DBI receiver 220, and a multi-mode DBI decoder 230. The transmitting device 100 and the receiving device 200 may communicate with each other through a plurality of data channels DQ and at least one DBI line or DBI channel DBI_L. In an example embodiment, the data transmitter 130 and the data receiver 210 may be a data transceiver, and the DBI transmitter 140 and the DBI receiver 220 may be a DBI transceiver.

In an example embodiment, the number of multi-mode DBI encoders 110 and the number of data transmitters 130 may correspond to the number of data channels DQ. For example, when the data channels DQ include 8 data channels, the transmitting device 100 may include 8 multi-mode DBI encoders 110 and 8 data transmitters 130. In an example embodiment, the number of DBI mode selectors 120 and the number of DBI transmitters 140 may correspond to the number of DBI channels DBI_L. For example, when the at least one DBI channel DBI_L includes one DBI channel, the transmitting device 100 may include one DBI mode selector 120 and one DBI transmitter 140.

In an example embodiment, the number of data receivers 210 and the number of multi-mode DBI decoders 230 may correspond to the number of data channels DQ. For example, when the data channels DQ include 8 data channels, the receiving device 200 may include 8 data receivers 210 and 8 multi-mode DBI decoders 230. In an example embodiment, the number of DBI receivers 220 may correspond to the number of DBI channels DBI_L. For example, when the at least one DBI channel DBI_L includes one DBI channel, the receiving device 200 may include one DBI receiver 220.

In an example embodiment, the transmitting device 100 may be a data processing device, and the receiving device 200 may be a memory device. However, in an example embodiment, the transmitting device 100 may be a memory device, and the receiving device 200 may be a data processing device. Also, in an embodiment, both the transmitting device 100 and the receiving device 200 may be memory devices. In the present specification, the term "memory device" may include any device including a plurality of memory cells. For example, the memory cells may be dynamic random access memory (DRAM) cells.

In an example embodiment, the transmitting device 100 and the receiving device 200 may transmit and receive data according to a pulse amplitude modulation (PAM) scheme. In an example embodiment, the transmitting device 100 is capable of transmitting a plurality of bits included in multi-bit data within a single symbol period by generating a symbol having one of different voltage levels from the multi-bit data by using the PAM scheme, thereby improving the data transmission speed of the memory system 10. For example, the transmitting device 100 and the receiving device 200 may transmit and receive data according to a PAM-4 scheme. A method of transmitting and receiving data according to the PAM-4 method will be described below with reference to FIGS. 2 and 3.

The multi-mode DBI encoder 110 may receive multi-bit data. Also, the multi-mode DBI encoder 110 may receive a multi-bit DBI signal DBI_MD from the DBI mode selector 120 and encode multi-bit data DATA according to the received multi-bit DBI signal DBI_MD, thereby generating encoded multi-bit data E_DATA. The multi-bit data DATA may be N-bit data, wherein N may be an integer of 2 or greater. In an example embodiment, the multi-bit data DATA may be 2-bit data ("00", "01", "10", or "11"). Detailed description of the operation of the multi-mode DBI encoder 110 will be described below with reference to FIGS. 5 to 7B.

The DBI mode selector 120 may select one multi-bit DBI signal DBI_MD from among a plurality of multi-bit DBI signals respectively corresponding to a plurality of DBI modes according to the multi-bit data DATA. In an example embodiment, when the multi-bit data DATA includes 2-bit data, the multi-bit DBI signal DBI_MD may be a 2-bit signal. In an example embodiment, when the multi-bit data DATA includes 3-bit data, the multi-bit DBI signal DBI_MD may be a 3-bit signal. However, the multi-bit data DATA may be 3-bit data and the multi-bit DBI signal DBI_MD may be a 2-bit signal. Detailed description of the operation of the DBI mode selector 120 will be described below with reference to FIG. 4.

The data transmitter 130 may generate a data symbol D_SB from the encoded multi-bit data E_DATA and transmit the generated data symbol D_SB to the receiving device 200 through a data channel DQ. For example, the data transmitter 130 may generate the data symbol D_SB having one voltage level from among first to fourth voltage levels (e.g., V0 to V3 in FIG. 2) from the encoded multi-bit data E_DATA by using the PAM-4 scheme. The DBI transmitter 140 may generate a DBI symbol DBI_SB from the multi-bit DBI signal DBI_MD and transmit a generated DBI symbol DBI_SB to the receiving device 200 through a DBI channel DBI_L. For example, the DBI transmitter 140 may generate the DBI symbol DBI_SB having one from among first to fourth voltage levels from the multi-bit DBI signal DBI_MD by using the PAM-4 scheme.

The data receiver 210 may receive the data symbol D_SB from the transmitting device 100 through the data channel DQ and generate the encoded multi-bit data E_DATA from the received data symbol D_SB. For example, the data receiver 210 may generate the encoded multi-bit data E_DATA from the data symbol D_SB having one from among the first to fourth voltage levels by using the PAM-4 scheme. The DBI receiver 220 may receive the DBI symbol DBI_SB from the transmitting device 100 through the DBI channel DBI_L and generate the multi-bit DBI signal DBI_MD from the received DBI symbol DBI_SB. For example, the DBI receiver 220 may generate the multi-bit DBI signal DBI_MD from the DBI symbol DBI_SB having one from among the first to fourth voltage levels by using the PAM-4 scheme.

Figures 2, 3:
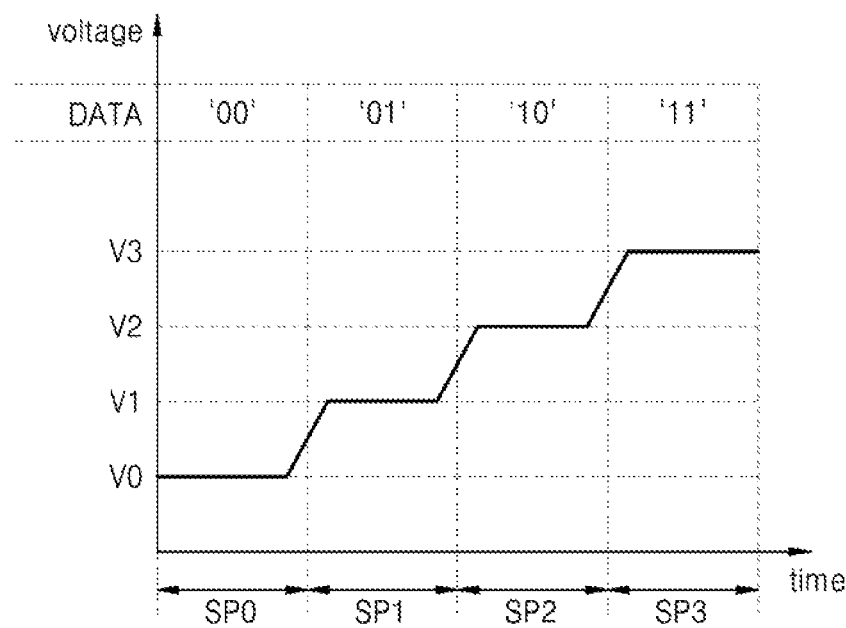
FIG. 2 is a graph showing an example of voltage levels for respective data symbols in the PAM-4 scheme according to an example embodiment.
FIG. 3 shows an example of costs for data symbols in the PAM-4 scheme according to an example embodiment.

FIG. 2 is a graph showing an example of voltage levels for respective data symbols in the PAM-4 scheme according to an example embodiment. In FIG. 2, the horizontal axis represents time, and the vertical axis represents voltage.

Referring to FIGS. 1 and 2 together, the multi-bit data DATA may be 2-bit data, and the data transmitter 130 may transmit 2-bit data per symbol period. For example, a symbol having a first voltage level V0 corresponding to data '00' may be generated in a first symbol period SP0, a symbol having a second voltage level V1 corresponding to data '01' may be generated in a second symbol period SP1, a symbol having a third voltage level V2 corresponding to data '10' may be generated in a third symbol period SP2, and a symbol having a fourth voltage level V3 corresponding to data '11' may be generated in a fourth symbol period SP3. Symbols generated in first to fourth symbol periods SP0 to SP3 may vary according to data.

FIG. 3 shows an example of costs for data symbols in the PAM-4 scheme according to an example embodiment.

Referring to FIGS. 1 to 3 together, for example, in the PAM-4 scheme, 2-bit data '00', '01', '10', and '11' may correspond to symbols 0, 1, 2, and 3, respectively. FIG. 3 shows an equivalent circuit diagram of a transmission driver TX for each symbol and an example of DC consumption currents according to equivalent resistances of the transmission driver TX. When transmitting each symbol, a "transmission cost" or a "cost" may be defined from a consumption current of the transmission driver TX, that is, a transmission consumption current. For example, the transmission driver TX may be included in the data transmitter 130.

For example, when a symbol 0 corresponding to data '00' is transmitted, the DC consumption current of the transmission driver TX may be 0 VDD. For example, when a symbol 1 corresponding to data '01' is transmitted, the DC consumption current of the transmission driver TX may be 5/18 VDD. For example, when a symbol 2 corresponding to data '10' is transmitted, the DC consumption current of the transmission driver TX may be 8/18 VDD. For example, when a symbol 3 corresponding to data '11' is transmitted, the DC consumption current of the transmission driver TX may be 9/18 VDD. Therefore, costs corresponding to data '00', '01', '10', and '11' may be defined as 0, 5, 8, and 9, respectively.

In the present example embodiment, costs of different symbols corresponding to different data are different from one another, and, in particular, the cost of the symbol 0 is the lowest and the cost of the symbol 3 is the highest. Therefore, to reduce the overall transmission cost, it is desirable to reduce the number of symbols 1, symbols 2, and symbols 3 from among transmitted symbols and increase the number of symbols 0. Thus, DBI encoding may be performed on the multi-bit data DATA according to the multi-bit DBI signal DBI_MD corresponding to each of a plurality of DBI modes.

Figures 4, 5:
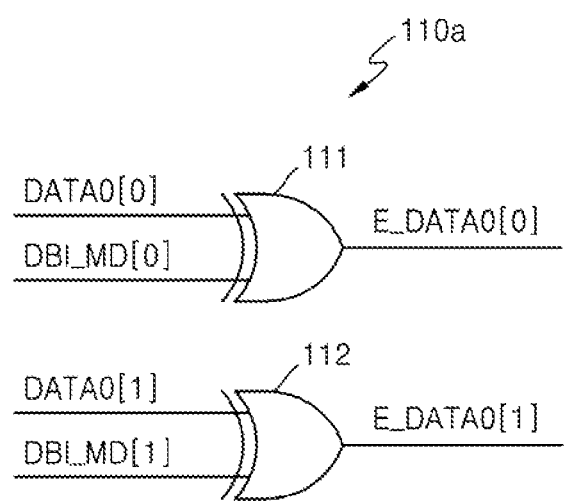
FIG. 4 is a table showing an example of a plurality of DBI modes according to an example embodiment.
FIG. 5 is a circuit diagram showing an example of a first multi-mode DBI encoder according to an example embodiment.

FIG. 4 is a table showing an example of a plurality of DBI modes according to an example embodiment.

Referring to FIG. 4, the DBI modes may include first to fourth DBI modes MD0 to MD3, and the first to fourth DBI modes MD0 to MD3 may correspond to first to fourth multi-bit DBI signals DBI_MD[1:0], respectively. The first to fourth multi-bit DBI signals DBI_MD[1:0] may each be a 2-bit signal, and the first to fourth multi-bit DBI signals DBI_MD[1:0] may correspond to DBI symbol DBI_SB 0, 1, 2, and 3, respectively.

For example, a first DBI mode MD0 may indicate a DBI encoding scheme that does not invert all bits of multi-bit data, and a first multi-bit DBI signal DBI_MD<0> may be indicated as "00". For example, a second DBI mode MD1 may indicate a DBI encoding scheme that inverts only the least significant bit (LSB) of multi-bit data, and a second multi-bit DBI signal DBI_MD<1> may be indicated as "01". For example, a third DBI mode MD2 may indicate a DBI encoding scheme that inverts only the most significant bit (MSB) of multi-bit data, and a third multi-bit DBI signal DBI_MD<2> may be indicated as "10". For example, a fourth DBI mode MD3 may indicate a DBI encoding scheme that inverts all bits of multi-bit data, and a fourth multi-bit DBI signal DBI_MD<3> may be indicated as "11".

Figures 6, 7A:
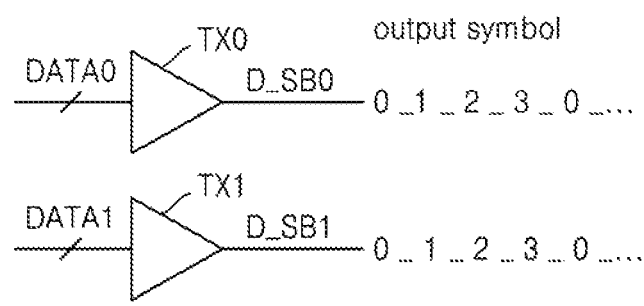
FIG. 6 is a table showing an example of the operation of the first multi-mode DBI encoder shown in FIG. 5.
FIG. 7A is a diagram showing an example of a PAM-4 data transmission to which DBI encoding is not applied according to a comparative example.

FIG. 5 is a circuit diagram showing an example of a first multi-mode DBI encoder 110a according to an example embodiment. FIG. 6 is a table showing an example of the operation of the first multi-mode DBI encoder 110a shown in FIG. 5.

Referring to FIGS. 4 to 6 together, for example, the first multi-mode DBI encoder 110a may correspond to an example of the multi-mode DBI encoder 110 of FIG. 1. For example, the first multi-mode DBI encoder 110a may receive first multi-bit data DATA0 and a multi-bit DBI signal DBI_MD, and generate encoded first multi-bit data E_DATA0 by DBI encoding the first multi-bit data DATA0 according to the received multi-bit DBI signal DBI_MD. As shown in FIG. 4, the multi-bit DBI signal DBI_MD may be one from among first to fourth multi-bit DBI signals (i.e., 00, 01, 10, and 11) respectively corresponding to the first to fourth DBI modes MD0 to MD3.

In an example embodiment, the first multi-mode DBI encoder 110a may include a first XOR gate 111 and a second XOR gate 112. The first XOR gate 111 may perform an XOR operation on an LSB signal of the first multi-bit data DATA0 (i.e., DATA[0]) and a LSB signal of the multi-bit DBI signal DBI_MD (i.e., DBI_MD[0]), thereby outputting an LSB signal of the encoded first multi-bit data E_DATA0 (i.e., E_DATA0[0]). The second XOR gate 112 may perform an XOR operation on a MSB signal of the first multi-bit data DATA0 (i.e., DATA[1]) and an MSB signal of the multi-bit DBI signal DBI_MD (i.e., DBI_MD[1]), thereby outputting an MSB signal of the encoded first multi-bit data E_DATA0 (i.e., E_DATA0[1]).

For example, when the first multi-bit data DATA0 is 00 and the multi-bit DBI signal DBI_MD is 00, first and second XOR gates 111 and 112 will each output 0. For example, when the first multi-bit data DATA0 is 01 and the multi-bit DBI signal DBI_MD is 01, the first and second XOR gates 111 and 112 may each output 0. For example, when the first multi-bit data DATA0 is 10 and the multi-bit DBI signal DBI_MD is 10, the first and second XOR gates 111 and 112 may each output 0. For example, when the first multi-bit data DATA0 is 11 and the multi-bit DBI signal DBI_MD is 11, the first and second XOR gates 111 and 112 may each output 0.

Figures 7B, 8A:
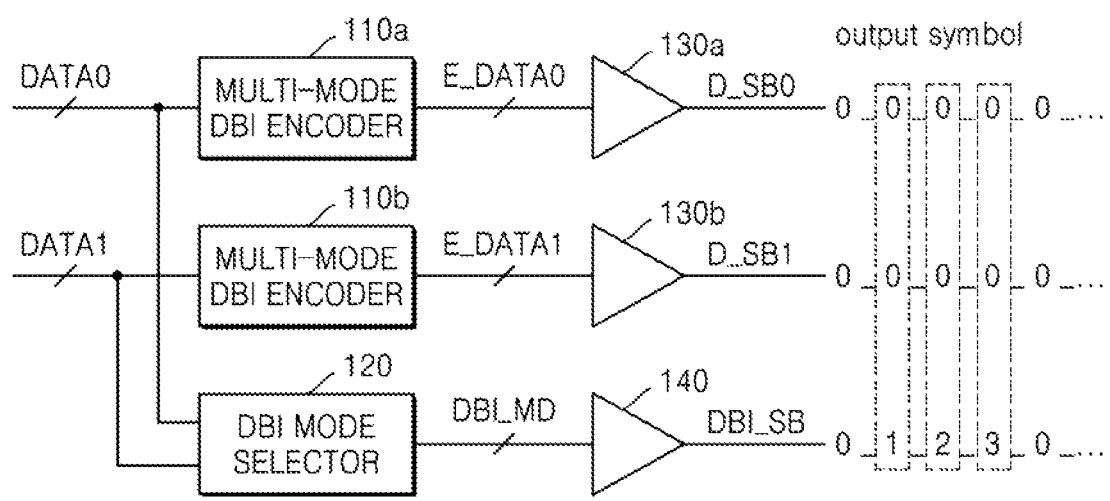
FIG. 7B is a table showing an example of a transmission cost according to the comparative example of FIG. 7A.
FIG. 8A is a diagram showing an example of a PAM-4 data transmission to which 2-bit DBI encoding is applied according to an example embodiment.

FIG. 7A is a diagram showing an example of a PAM-4 data transmission to which DBI encoding is not applied, according to a comparative example, and FIG. 7B is a table showing an example of a transmission cost according to the comparative example of FIG. 7A.

Referring to FIGS. 3, 7A, and 7B together, first and second transmission drivers TX0 and TX1 may output first and second data symbols D_SB0 and D_SB1 from first and second multi-bit data DATA0 and DATA1, respectively. When DBI encoding is not applied, the total transmission cost for the data symbol D_SB may correspond to the sum of the transmission cost for a first data symbol D_SB0 and the transmission cost for a second data symbol D_SB1.

For example, when both the first and second multi-bit data DATA0 and DATA1 are "00", the transmission cost for the first and second data symbols D_SB0 and D_SB1 is 0. Also, when both the first and second multi-bit data DATA0 and DATA1 are "01", the transmission cost for each of the first and second data symbols D_SB0 and D_SB1 is 5, and thus the total transmission cost for the data symbol D_SB is 10. Also, when both the first and second multi-bit data DATA0 and DATA1 are "10", the transmission cost for each of the first and second data symbols D_SB0 and D_SB1 is 8, and thus the total transmission cost for the data symbol D_SB is 16. Also, when both the first and second multi-bit data DATA0 and DATA1 are "11", the transmission cost for each of the first and second data symbols D_SB0 and D_SB1 is 9, and thus the total transmission cost for the data symbol D_SB is 18.

Figures 8B, 9:
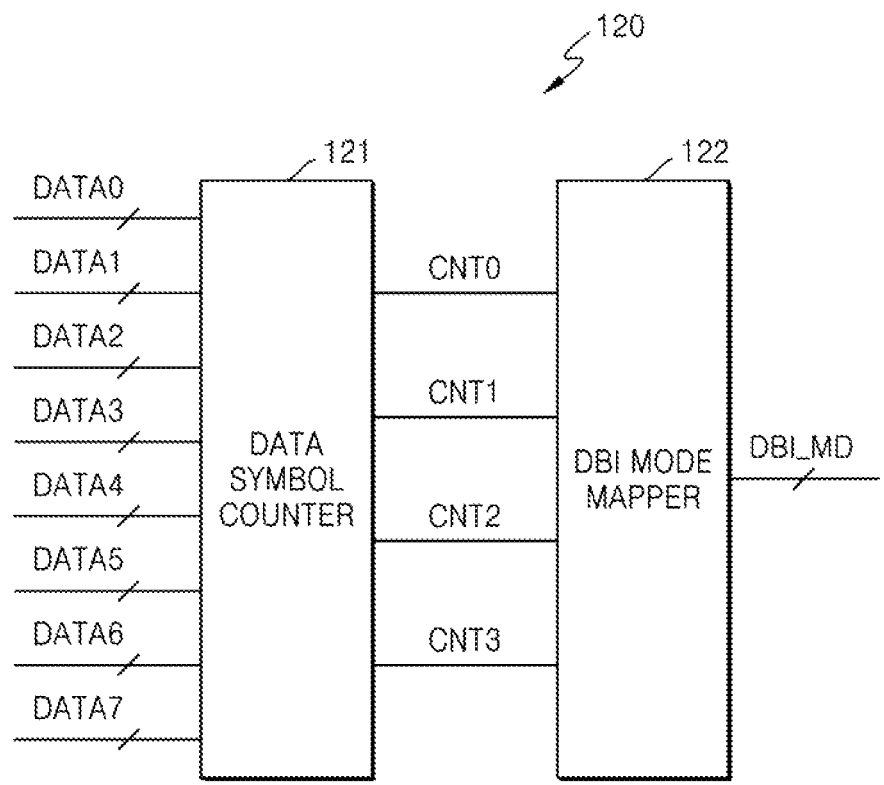
FIG. 8B is a diagram showing an example of a transmission cost according to the example of FIG. 8A.
FIG. 9 is a block diagram showing an example of the DBI mode selector according to an example embodiment.

FIG. 8A is a diagram showing an example of a PAM-4 data transmission to which 2-bit DBI encoding is applied according to an example embodiment, and FIG. 8B is a diagram showing an example of a transmission cost according to the example of FIG. 8A.

Referring to FIGS. 3, 8A, and 8B together, the multi-bit DBI signal DBI_MD may be a 2-bit signal, and the multi-bit DBI signal DBI_MD may correspond to one from among the first to fourth DBI modes. First and second multi-mode DBI encoders 110*a* and 110*b* may be included in the multi-mode DBI encoder 110 of FIG. 1, and the DBI mode selector 120 may correspond to the DBI mode selector 120 of FIG. 1. Also, first and second data transmitters 130*a* and 130*b* may be included in the data transmitter 130 of FIG. 1.

The first multi-mode DBI encoder 110*a* may generate encoded first multi-bit data E_DATA0 by DBI encoding the first multi-bit data DATA0 according to the multi-bit DBI signal DBI_MD. The second multi-mode DBI encoder 110*b* may generate encoded second multi-bit data E_DATA1 by DBI encoding the second multi-bit data DATA1 according to the multi-bit DBI signal DBI_MD.

Figure 13:
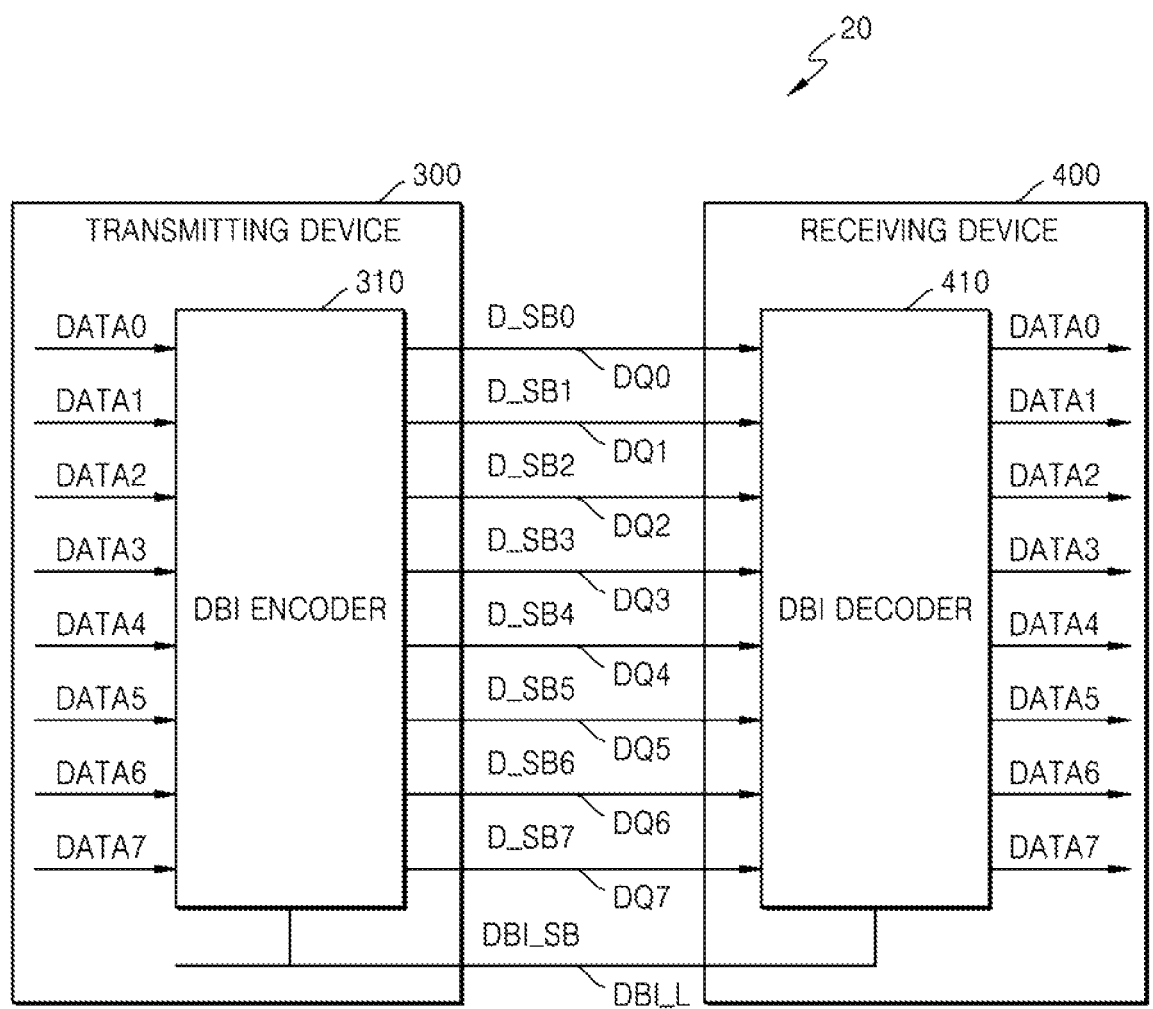
FIG. 13 is a block diagram showing a memory system according to a first channel grouping scheme according to an example embodiment.

The first data transmitter 130*a* may transmit a first data symbol D_SB0 corresponding to the encoded first multi-bit data E_DATA0 to a first data channel (e.g., DQ0 in FIG. 13), and the second data transmitter 130*b* may transmit a second data symbol D_SB1 corresponding to the encoded second multi-bit data E_DATA1 to a second data channel (e.g., DQ1 of FIG. 13). The DBI transmitter 140 may transmit a DBI symbol DBI_SB corresponding to the multi-bit DBI signal DBI_MD to a DBI channel (e.g., DBI_L in FIG. 1).

In the present example embodiment, when data is transmitted by applying 2-bit DBI encoding, the first and second data symbols D_SB0 and D_SB1 may be transmitted through first and second data channels, and the DBI symbol DBI_SB may be simultaneously transmitted through the DBI channel. Therefore, the total transmission cost may correspond to the sum of the transmission cost for the first data symbol D_SB0, the transmission cost for the second data symbol D_SB1, and the transmission cost for the DBI symbol DBI_SB.

For example, when both first and second multi-bit data DATA0 and DATA1 are "00", a first DBI mode may be selected. Therefore, the first and second multi-mode DBI encoders 110*a* and 110*b* may DBI-encode the first and second multi-bit data DATA0 and DATA1 in the first DBI mode, thereby outputting the encoded first and second multi-bit data E_DATA0 and E_DATA1 as "00" and "00", respectively. The first and second data transmitters 130*a* and 130*b* may output first and second data symbols D_SB0 and D_SB1 respectively corresponding to the encoded first and second multi-bit data E_DATA0 and E_DATA1 as 0. At this time, the transmission cost for the data symbol D_SB 00 is 0 and the transmission cost for a DBI symbol DBI_SB 0 is 0, and thus the total transmission cost is 0.

For example, when both first and second multi-bit data DATA0 and DATA1 are "01", a second DBI mode may be selected. Therefore, the first and second multi-mode DBI encoders 110*a* and 110*b* may DBI-encode the first and second multi-bit data DATA0 and DATA1 in the second DBI mode, thereby outputting the encoded first and second multi-bit data E_DATA0 and E_DATA1 as "00" and "00", respectively. The first and second data transmitters 130*a* and 130*b* may output the first and second data symbols D_SB0 and D_SB1 respectively corresponding to the encoded first and second multi-bit data E_DATA0 and E_DATA1 as 0. At this time, the transmission cost for the data symbol D_SB 00 is 0 and the transmission cost for a DBI symbol DBI_SB 1 is 5, and thus the total transmission cost is 5. As described above, when both the first and second multi-bit data DATA0 and DATA1 are "01", compared to the case where DBI encoding is not applied as shown in FIG. 7B, the total transmission cost may be reduced from 10 to 5.

For example, when both first and second multi-bit data DATA0 and DATA1 are "10", a third DBI mode may be selected. Therefore, the first and second multi-mode DBI encoders 110*a* and 110*b* may DBI-encode the first and second multi-bit data DATA0 and DATA1 in the third DBI mode, thereby outputting the encoded first and second multi-bit data E_DATA0 and E_DATA1 as "00" and "00", respectively. The first and second data transmitters 130*a* and 130*b* may output the first and second data symbols D_SB0 and D_SB1 respectively corresponding to the encoded first and second multi-bit data E_DATA0 and E_DATA1 as 0. At this time, the transmission cost for the data symbol D_SB 00 is 0 and the transmission cost for a DBI symbol DBI_SB 2 is 8, and thus the total transmission cost is 8. As described above, when both the first and second multi-bit data DATA0 and DATA1 are "10", compared to the case where DBI encoding is not applied as shown in FIG. 7B, the total transmission cost may be reduced from 16 to 8.

For example, when both first and second multi-bit data DATA0 and DATA1 are "11", a fourth DBI mode may be selected. Therefore, the first and second multi-mode DBI encoders 110*a* and 110*b* may DBI-encode the first and second multi-bit data DATA0 and DATA1 in the fourth DBI mode, thereby outputting the encoded first and second multi-bit data E_DATA0 and E_DATA1 as "00" and "00", respectively. The first and second data transmitters 130*a* and 130*b* may output the first and second data symbols D_SB0 and D_SB1 respectively corresponding to the encoded first and second multi-bit data E_DATA0 and E_DATA1 as 0. At this time, the transmission cost for the data symbol D_SB 00 is 0 and the transmission cost for a DBI symbol DBI_SB 3 is 9, and thus the total transmission cost is 9. As described above, when both the first and second multi-bit data DATA0 and DATA1 are "11", compared to the case where DBI encoding is not applied as shown in FIG. 7B, the total transmission cost may be reduced from 18 to 9.

According to an example embodiment, as DBI encoding is performed on each of the first and second multi-bit data DATA0 and DATA1 by using the multi-bit DBI signal DBI_MD, compared to a case where DBI encoding is not applied, the total transmission cost may be significantly reduced. Meanwhile, when DBI encoding is performed on the first and second multi-bit data DATA0 and DATA1 by using a 1-bit DBI signal, the total transmission cost will be reduced only when both the first and second multi-bit data DATA0 and DATA1 are "11", and the transmission cost when both the first and second multi-bit data DATA0 and DATA1 are "01" or "10" will be identical to that of the case where DBI encoding is not applied. However, according to the present example embodiment, by performing DBI encoding on the first and second multi-bit data DATA0 and DATA1 by using a 2-bit DBI signal, the total transmission cost may be significantly reduced overall.

FIG. 9 is a block diagram showing an example of the DBI mode selector 120 according to an example embodiment.

Referring to FIG. 9, the DBI mode selector 120 may include a data symbol counter 121 and a DBI mode mapper 122. The data symbol counter 121 may receive a plurality of pieces of multi-bit data, e.g., first to eighth multi-bit data DATA0 to DATA7, count the number of each of a plurality of data patterns in the first to eighth multi-bit data DATA0 to DATA7, and generate first to fourth count signals CNT0 to CNT3. For example, the data patterns may include "00", "01", "10", and "11".

The DBI mode mapper 122 may calculate the total transmission cost corresponding to the sum of transmission costs for data symbols and a transmission cost for a DBI symbol with respect to each of the first to fourth DBI modes DBI_MD0 to DBI_MD3 based on the first to fourth count signals CNT0 to CNT3. Next, the DBI mode mapper 122 may select a DBI mode corresponding to the minimum transmission cost from among the total transmission costs for the first to fourth DBI modes DBI_MD0 to DBI_MD3 and output a multi-bit DBI signal DBI_MD corresponding to the selected DBI mode.

FIG. 10 is a table showing an example of the operation of the DBI mode selector 120 shown in FIG. 9.

Hereinafter, the operation of the DBI mode selector 120 will be described in detail with reference to FIGS. 9 and 10 together. First, the operations of the data symbol counter 121 and the DBI mode mapper 122 for a first case CASE0 will be described.

In the first case CASE0, all of the first to eighth multi-bit data DATA0 to DATA7 may be "11". At this time, the data symbol counter 121 may output 0 corresponding to the number of data patterns "00" in the first to eighth multi-bit data DATA0 to DATA7 as a first count signal CNT0, output 0 corresponding to the number of data patterns "01" in the first to eighth multi-bit data DATA0 to DATA7 as a second count signal CNT1, output 0 corresponding to the number of data patterns "10" in the first to eighth multi-bit data DATA0 to DATA7 as a third count signal CNT2, and output 8 corresponding to the number of data patterns "11" in the first to eighth multi-bit data DATA0 to DATA7 as a fourth count signal CNT3.

In a first DBI mode DBI_MD0, the transmission count of the DBI symbol DBI_SB corresponding to the first multi-bit DBI signal 00 is 0. When the data pattern "11" is DBI encoded in the first DBI mode DBI_MD0, the data pattern "11" is generated, and the transmission cost for data symbols corresponding to the data pattern "11" (e.g., D_SB0 to D_SB7 in FIG. 13) is 72 (=9*8). Therefore, the total transmission cost for the first DBI mode DBI_MD0 is 72 (=0+72).

In a second DBI mode DBI_MD1, the transmission count of the DBI symbol DBI_SB corresponding to a second multi-bit DBI signal 01 is 5. When the data pattern "11" is DBI encoded in the second DBI mode DBI_MD1, the data pattern "10" is generated, and the transmission cost for data symbols corresponding to the data pattern "10" (e.g., D_SB0 to D_SB7 in FIG. 13) is 64 (=8*8). Therefore, the total transmission cost for the second DBI mode DBI_MD1 is 69 (=5+64).

In a third DBI mode DBI_MD2, the transmission count of the DBI symbol DBI_SB corresponding to a third multi-bit DBI signal 10 is 8. When the data pattern "11" is DBI encoded in the third DBI mode DBI_MD2, the data pattern "01" is generated, and the transmission cost for data symbols corresponding to the data pattern "01" (e.g., D_SB0 to D_SB7 in FIG. 13) is 40 (=5*8). Therefore, the total transmission cost for the third DBI mode DBI_MD2 is 48 (=8+40).

In a fourth DBI mode DBI_MD3, the transmission count of the DBI symbol DBI_SB corresponding to a fourth multi-bit DBI signal 11 is 9. When the data pattern "11" is DBI encoded in the fourth DBI mode DBI_MD3, the data pattern "00" is generated, and the transmission cost for data symbols corresponding to the data pattern "00" (e.g., D_SB0 to D_SB7 in FIG. 13) is 0 (=0*8). Therefore, the total transmission cost for the fourth DBI mode DBI_MD3 is 9 (=9+0).

As such, the DBI mode mapper 122 may calculate the respective total transmission costs for the first to fourth DBI modes DBI_MD0 to DBI_MD3 as 72, 69, 48, and 9, and select the fourth DBI mode DBI_MD3 corresponding to the minimum transmission cost (that is, 9) from among the calculated total transmission costs. At this time, the DBI symbol DBI_SB corresponding to the fourth DBI mode DBI_MD3 is 3.

Next, the operations of the data symbol counter 121 and the DBI mode mapper 122 for a second case CASE1 will be described.

In the second case CASE1, all of the first to eighth multi-bit data DATA0 to DATA7 may be "10". At this time, the data symbol counter 121 may output 0 corresponding to the number of data patterns "00" in the first to eighth multi-bit data DATA0 to DATA7 as a first count signal CNT0, output 0 corresponding to the number of data patterns "01" in the first to eighth multi-bit data DATA0 to DATA7 as a second count signal CNT1, output 8 corresponding to the number of data patterns "10" in the first to eighth multi-bit data DATA0 to DATA7 as a third count signal CNT2, and output 0 corresponding to the number of data patterns "11" in the first to eighth multi-bit data DATA0 to DATA7 as a fourth count signal CNT3.

In the first DBI mode DBI_MD0, the transmission count of the DBI symbol DBI_SB corresponding to the first multi-bit DBI signal 00 is 0. When the data pattern "10" is DBI encoded in the first DBI mode DBI_MD0, the data pattern "10" is generated, and the transmission cost for data symbols corresponding to the data pattern "10" (e.g., D_SB0 to D_SB7 in FIG. 13) is 64 (=8*8). Therefore, the total transmission cost for the first DBI mode DBI_MD0 is 64 (=0+64).

In the second DBI mode DBI_MD1, the transmission count of the DBI symbol DBI_SB corresponding to a second multi-bit DBI signal 01 is 5. When the data pattern "10" is DBI encoded in the second DBI mode DBI_MD1, the data pattern "11" is generated, and the transmission cost for data symbols corresponding to the data pattern "11" (e.g., D_SB0 to D_SB7 in FIG. 13) is 72 (=9*8). Therefore, the total transmission cost for the second DBI mode DBI_MD1 is 77 (=5+72).

In the third DBI mode DBI_MD2, the transmission count of the DBI symbol DBI_SB corresponding to a third multi-bit DBI signal 10 is 8. When the data pattern "10" is DBI encoded in the third DBI mode DBI_MD2, the data pattern "00" is generated, and the transmission cost for data symbols corresponding to the data pattern "00" (e.g., D_SB0 to D_SB7 in FIG. 13) is 0 (=0*8). Therefore, the total transmission cost for the third DBI mode DBI_MD2 is 8 (=8+0).

In the fourth DBI mode DBI_MD3, the transmission count of the DBI symbol DBI_SB corresponding to a fourth multi-bit DBI signal 11 is 9. When the data pattern "10" is DBI encoded in the fourth DBI mode DBI_MD3, the data pattern "01" is generated, and the transmission cost for data symbols corresponding to the data pattern "01" (e.g., D_SB0 to D_SB7 in FIG. 13) is 40 (=5*8). Therefore, the total transmission cost for the fourth DBI mode DBI_MD3 is 49 (=9+40).

As such, the DBI mode mapper 122 may calculate the respective total transmission costs for the first to fourth DBI modes DBI_MD0 to DBI_MD3 as 64, 77, 8, and 49, and select the third DBI mode DBI_MD2 corresponding to the minimum transmission cost (that is, 8) from among the calculated total transmission costs. At this time, the DBI symbol DBI_SB corresponding to the third DBI mode DBI_MD2 is 2.

Figure 11:
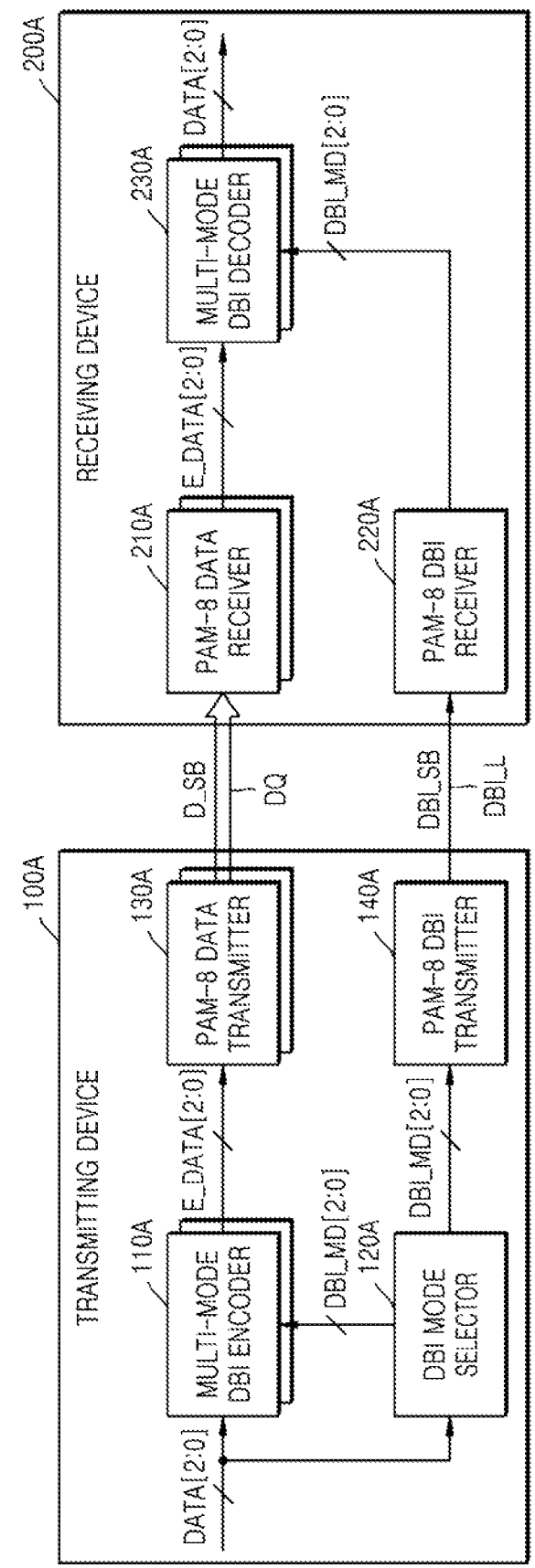
FIG. 11 is a block diagram showing a memory system according to an example embodiment.

FIG. 11 is a block diagram showing a memory system 10A according to an example embodiment.

Referring to FIG. 11, the memory system 10A may include a transmitting device 100A and a receiving device 200A, and the transmitting device 100A and the receiving device 200A may communicate with each other via a plurality of data channels DQ and at least one DBI line or DBI channel DBI_L. The memory system 10A corresponds to a modified example of the memory system 10 shown in FIG. 1, and the descriptions given above with reference to FIGS. 1 to 10 may also be applied to the present example embodiment.

The transmitting device 100A may include a plurality of multi-mode DBI encoders 110A and a DBI mode selector 120A. In one embodiment, multi-bit data may be 3-bit data DATA[2:0] ("000", "001", "010", "011", "100", "101", "110", and "111"), and a multi-bit DBI signal DBI_MD[2:0] may be a 3-bit signal. Therefore, the transmitting device 100A may further include a plurality of PAM-8 data transmitters 130A and a PAM-8 DBI transmitter 140A.

FIG. 12 is a table showing an example of a plurality of DBI modes according to the example embodiment of FIG. 11.

Referring to FIGS. 11 and 12 together, the DBI mode selector 120A may select one 3-bit DBI signal DBI_MD[2:0] from among a plurality of 3-bit DBI signals respectively corresponding to the DBI modes, according to the 3-bit data DATA[2:0]. For example, the DBI modes may include first to eighth DBI modes MD0 to MD7.

The first DBI mode MD0 may indicate, for example, a DBI encoding scheme that does not invert all bits of the 3-bit data DATA[2:0] and may be indicated as "000".

For example, the second DBI mode MD1 may indicate a DBI encoding scheme that inverts only the LSB of the 3-bit data DATA[2:0] and may be indicated as "001". For example, the third DBI mode MD2 may indicate a DBI encoding scheme that inverts only the central significant bit (CSB) of the 3-bit data DATA[2:0] and may be indicated as "010". For example, the fourth DBI mode MD3 may indicate a DBI encoding scheme that inverts only the CSB and the LSB of the 3-bit data DATA[2:0] and may be indicated as "011".

For example, a fifth DBI mode MD4 may indicate a DBI encoding scheme that inverts only the MSB of the 3-bit data DATA[2:0] and may be indicated as "100". For example, a sixth DBI mode MD5 may indicate a DBI encoding scheme that inverts only the MSB and the LSB of the 3-bit data DATA[2:0] and may be indicated as "101". For example, a seventh DBI mode MD6 may indicate a DBI encoding scheme that inverts only the MSB and the CSB of the 3-bit data DATA[2:0] and may be indicated as "110". For example, the eighth DBI mode MD7 may indicate a DBI encoding scheme that inverts all bits of the 3-bit data DATA[2:0] and may be indicated as "111".

Referring back to FIG. 11, the multi-mode DBI encoders 110A may respectively receive a plurality of pieces of 3-bit data DATA[2:0]. Also, the multi-mode DBI encoders 110A may receive a 3-bit DBI signal DBI_MD[2:0] from the DBI mode selector 120A and, according to the received multi-bit DBI signal DBI_MD[2:0], DBI encode the 3-bit data DATA[2:0], thereby generating a plurality of pieces of encoded 3-bit data E_DATA[2:0].

The PAM-8 data transmitters 130A may respectively generate a plurality of data symbols D_SB from the encoded 3-bit data E_DATA[2:0] by using the PAM-8 scheme, and transmit the generated data symbols D_SB to the receiving device 200A through the data channels DQ. In this case, each of the data symbols D_SB may have one from among first to eighth voltage levels depending on corresponding encoded 3-bit data E_DATA[2:0]. The PAM-8 DBI transmitter 140A may generate the DBI symbol DBI_SB having one from among the first to eighth voltage levels from the 3-bit DBI signal DBI_MD[2:0] by using the PAM-8 scheme, and transmit the generated DBI symbol DBI_SB to the receiving device 200A through a DBI channel DBI_L.

The receiving device 200A may include a plurality of PAM-8 data receivers 210A, a PAM-8 DBI receiver 220A, and a plurality of multi-mode DBI decoders 230A. The PAM-8 data receivers 210A may respectively receive the data symbols D_SB from the transmitting device 100A through the data channels DQ and generate a plurality of pieces of encoded 3-bit data E_DATA[2:0] from the data symbols D_SB by using the PAM-8 scheme, respectively. The PAM-8 DBI receiver 220A may receive the DBI symbol DBI_SB from the transmitting device 100A through the DBI channel DBI_L and generate the 3-bit DBI signal DBI_MD[2:0] from the received DBI symbol DBI_SB by using the PAM-8 scheme.

FIG. 13 is a block diagram showing a memory system 20 according to a first channel grouping scheme according to an example embodiment.

Referring to FIG. 13, the memory system 20 may include a transmitting device 300 and a receiving device 400. The transmitting device 300 may include a multi-mode DBI encoder 310. For example, the multi-mode DBI encoder 310 may include the multi-mode DBI encoders 110 and the data transmitters 130 of FIG. 1. Although not shown, the transmitting device 300 may further include one DBI mode selector corresponding to the DBI channel DBI_L. The receiving device 400 may include a multi-mode DBI decoder 410. For example, the multi-mode DBI decoder 410 may include the data receivers 210 and the multi-mode DBI decoders 230 of FIG. 1.

According to the first channel grouping scheme, for example, one DBI channel DBI_L may be allocated to 8 data channels. For example, the transmitting device 300 and the receiving device 400 may communicate with each other through eight data channels DQ0 to DQ7 and the one DBI channel DBI_L. The multi-mode DBI encoder 310 may generate first to eighth data symbols D_SB0 to D_SB7 from first to eighth multi-bit data DATA0 to DATA7, and transmit the generated first to eighth data symbols D_SB0 to D_SB7 to the receiving device 400 through the 8 data channels DQ0 to DQ7. The transmitting device 300 may generate the DBI symbol DBI_SB corresponding to the first to eighth data symbols D_SB0 to D_SB7, and transmit the generated DBI symbol DBI_SB to the receiving device 400 through the one DBI channel DBI_L.

The multi-mode DBI decoder 410 may receive the first to eighth data symbols D_SB0 to D_SB7 from the transmitting device 300 through the 8 data channels DQ0 to DQ7, and receive the DBI symbol DBI_SB from the transmitting device 300 through the one DBI channel DBI_SB. The multi-mode DBI decoder 410 may generate the first to eighth multi-bit data DATA0 to DATA7 from the first to eighth data symbols D_SB0 to D_SB7 by using the received DBI symbol DBI_SB, respectively.

Figure 14:
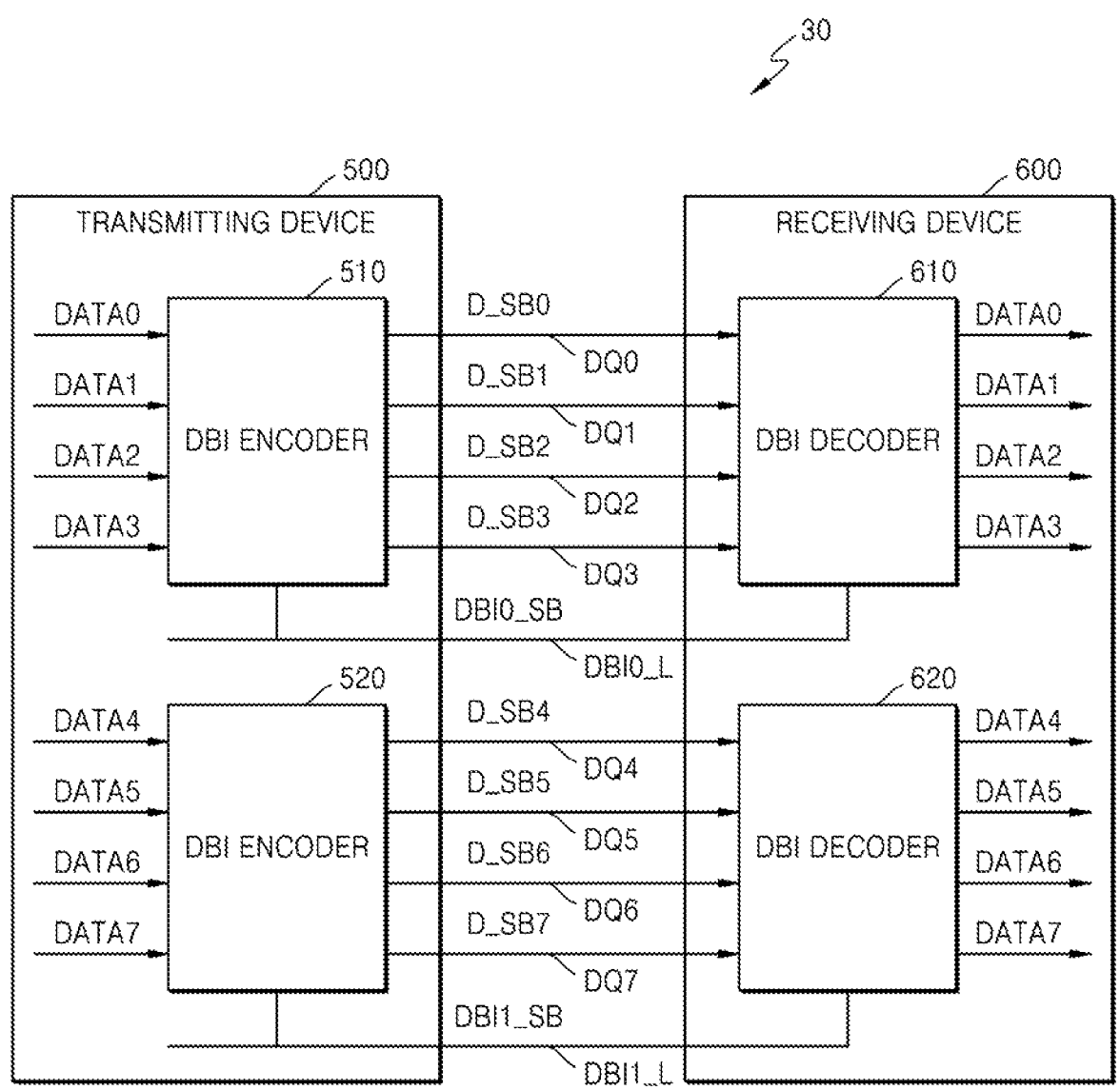
FIG. 14 is a block diagram showing a memory system according to a second channel grouping scheme according to an example embodiment.

FIG. 14 is a block diagram showing a memory system 30 according to a second channel grouping scheme according to an example embodiment.

Referring to FIG. 14, the memory system 30 may include a transmitting device 500 and a receiving device 600. The transmitting device 500 may include a multi-mode DBI encoder 510. For example, the multi-mode DBI encoder 510 may include the multi-mode DBI encoders 110 and the data transmitters 130 of FIG. 1. Although not shown, the transmitting device 500 may further include a first DBI mode selector corresponding to a first DBI channel DBI0_L and a second DBI mode selector corresponding to a second DBI channel DBI1_L. The receiving device 600 may include a multi-mode DBI decoder 610. For example, the multi-mode DBI decoder 610 may include the data receivers 210 and the multi-mode DBI decoders 230 of FIG. 1.

According to the second channel grouping scheme, for example, one DBI channel DBI_L may be allocated to 4 data channels. For example, the transmitting device 500 and the receiving device 600 may communicate with each other through the eight data channels DQ0 to DQ7 and two DBI channels DBI0_L and DBI1_L. The multi-mode DBI encoder 510 may generate first to fourth data symbols D_SB0 to D_SB3 from first to fourth multi-bit data DATA0 to DATA3 and transmit the generated first to fourth data symbols D_SB0 to D_SB3 to the receiving device 600 through first to fourth data channels DQ0 to DQ3. The first DBI mode selector may generate a first multi-bit DBI signal from the first to fourth multi-bit data DATA0 to DATA3. The transmitting device 500 may generate a first DBI symbol DBI0_SB from the first multi-bit DBI signal and transmit the generated first DBI symbol DBI0_SB to the receiving device 600 through the first DBI channel DBI0_L.

The multi-mode DBI decoder 610 may receive the first to fourth data symbols D_SB0 to D_SB3 from the transmitting device 500 through the first to fourth data channels DQ0 to DQ3 and receive the first DBI symbol DBI0_SB from the transmitting device 500 through the first DBI channel DBI0_L. The multi-mode DBI decoder 610 may generate the first to fourth multi-bit data DATA0 to DATA3 from the first to fourth data symbols D_SB0 to D_SB3 by using the received first DBI symbol DBI0_SB, respectively.

The multi-mode DBI encoder 510 may generate fifth to eighth data symbols D_SB4 to D_SB7 from fifth to eighth multi-bit data DATA4 to DATA7 and transmit the generated fifth to eighth data symbols D_SB4 to D_SB7 to the receiving device 600 through fifth to eighth data channels DQ4 to DQ7. The second DBI mode selector may generate a second multi-bit DBI signal from the fifth to eighth multi-bit data DATA4 to DATA7. The transmitting device 500 may generate a second DBI symbol DBI1_SB from the second multi-bit DBI signal and transmit the generated second DBI symbol DBI1_SB to the receiving device 600 through the second DBI channel DBI1_L.

The multi-mode DBI decoder 610 may receive the fifth to eighth data symbols D_SB4 to D_SB7 from the transmitting device 500 through the fifth to eighth data channels DQ4 to DQ7 and receive the second DBI symbol DBI1_SB from the transmitting device 500 through the second DBI channel DBI1_L. The multi-mode DBI decoder 610 may generate the fifth to eighth multi-bit data DATA4 to DATA7 from the fifth to eighth data symbols D_SB4 to D_SB7 by using the received second DBI symbol DBI1_SB, respectively.

Figure 15:
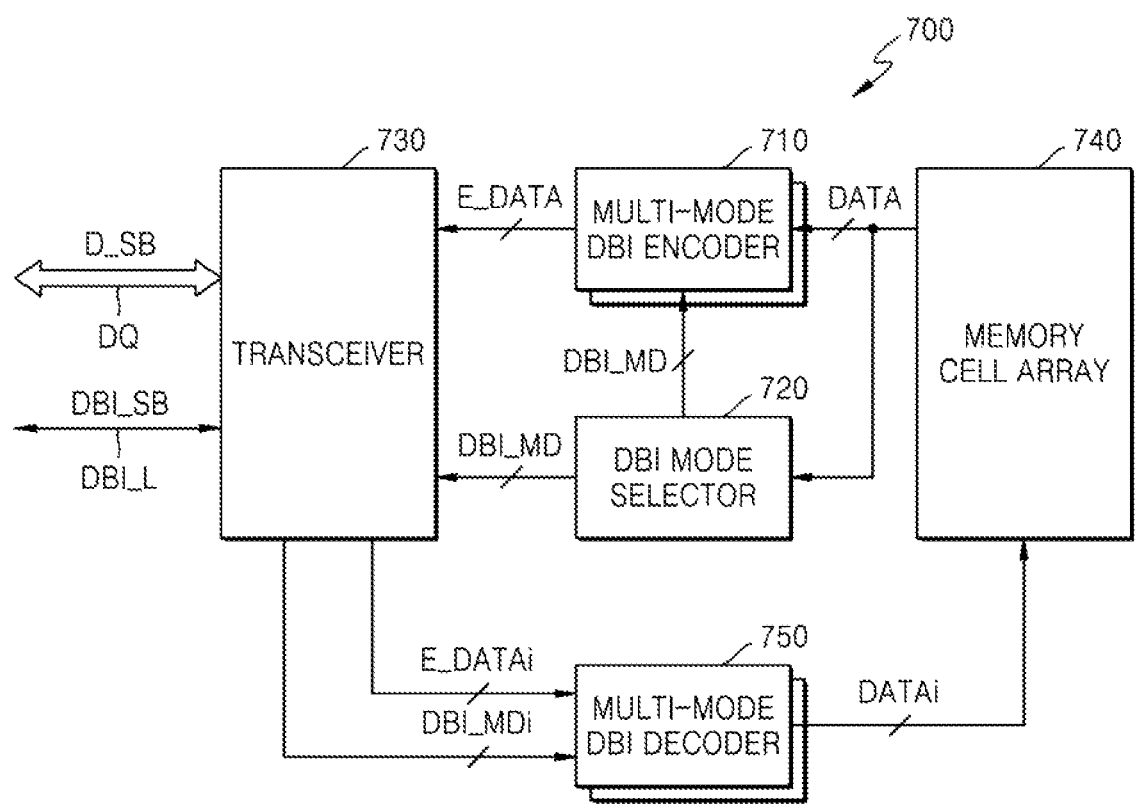
FIG. 15 is a block diagram showing a memory device according to an example embodiment.

FIG. 15 is a block diagram showing a memory device 700 according to an example embodiment.

Referring to FIG. 15, the memory device 700 may include a multi-mode DBI encoder 710, a DBI mode selector 720, a transceiver 730, a memory cell array 740, and a multi-mode DBI decoder 750. The memory device 700 may correspond to the transmitting device 100 or the receiving device 200 of FIG. 1, the transmitting device 100A or the receiving device 200A of FIG. 11, the transmitting device 300 or the receiving device 400 of FIG. 13, or the transmitting device 500 or the receiving device 600 of FIG. 14, and descriptions given above with reference to FIGS. 1 to 14 may also be applied to the present example embodiment.

The memory cell array 740 may include a plurality of memory cells. In the present specification, the term "memory device" may include any device including a plurality of memory cells. For example, the memory cells may be dynamic random access memory (DRAM) cells. For example, the memory device may include DRAM like double data rate synchronous dynamic random access memory (DDR SDRAM), low power double data rate LPDD (LPDDR) SDRAM, graphics double data rate (GDDR) SDRAM, and Rambus dynamic random access memory (RDRAM). The memory device may also include a non-volatile memory like flash memory, magnetic RAM (MRAM), ferroelectric RAM (FeRAM), phase change RAM (PRAM), and resistive RAM (ReRAM).

The multi-mode DBI encoder 710 and the DBI mode selector 720 may receive multi-bit data DATA stored in the memory cell array 740. The DBI mode selector 720 may select one multi-bit DBI signal DBI_MD from among a plurality of multi-bit DBI signals respectively corresponding to a plurality of DBI modes according to the multi-bit data DATA, and provide the selected multi-bit DBI signal DBI_MD to the multi-mode DBI encoder 710. The multi-mode DBI encoder 710 may generate encoded multi-bit data E_DATA by DBI encoding the multi-bit data DATA according to the multi-bit DBI signal DBI_MD. For example, the multi-mode DBI encoder 710 may include the multi-mode DBI encoder 110 of FIG. 1, and the DBI mode selector 720 may include the DBI mode selector 120 of FIG. 1.

The transceiver 730 may generate the data symbol D_SB having one from among a plurality of voltage levels from the encoded multi-bit data E_DATA by using a PAM scheme, and transmit the generated data symbol D_SB through the data channel DQ. Also, the transceiver 730 may generate the DBI symbol DBI_SB having one from among the voltage levels from the multi-bit DBI signal DBI_MD by using a PAM scheme, and transmit the generated DBI symbol DBI_SB through the DBI channel DBI_L. For example, the transceiver 730 may include the data transmitter 130 and the DBI transmitter 140 of FIG. 1.

Also, the transceiver 730 may receive the data symbol D_SB through the data channel DQ, and generate encoded multi-bit input data E_DATAi from the received data symbol D_SB. Also, the transceiver 730 may receive the DBI symbol DBI_SB through the DBI channel DBI_L and generate a multi-bit input DBI signal DBI_MDi from the received DBI symbol DBI_SB. For example, the transceiver 730 may include the data receiver 210 and the DBI receiver 220 of FIG. 1.

The multi-mode DBI decoder 750 may generate multi-bit input data DATAi by DBI decoding the encoded multi-bit input data E_DATAi in a DBI mode selected from among a plurality of DBI modes, according to the multi-bit input DBI signal DBI_MDi. The generated multi-bit input data DATAi may be stored in the memory cell array 740. For example, the multi-mode DBI decoder 750 may include the multi-mode DBI decoder 230 of FIG. 1.

Figure 16:
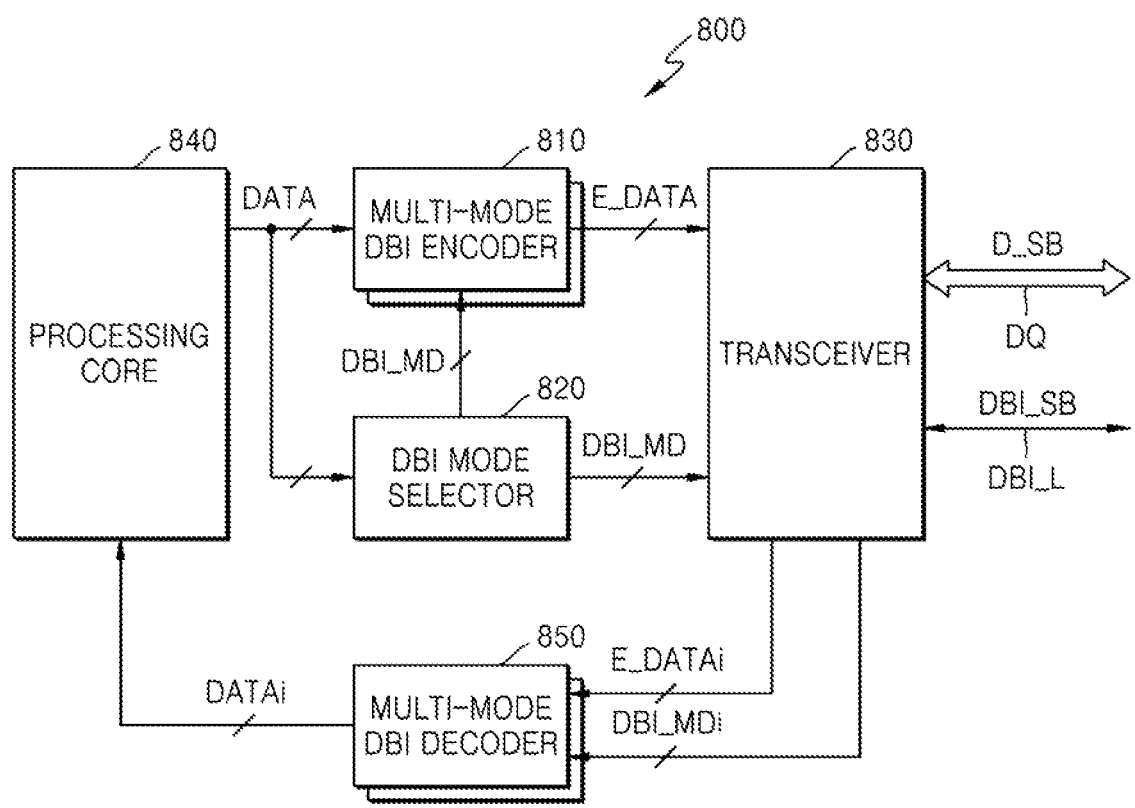
FIG. 16 is a block diagram showing a data processing device according to an example embodiment.

FIG. 16 is a block diagram showing a data processing device 800 according to an example embodiment.

Referring to FIG. 16, the data processing device 800 may include a multi-mode DBI encoder 810, a DBI mode selector 820, a transceiver 830, a processing core 840, and a multi-mode DBI decoder 850. The data processing device 800 may correspond to the transmitting device 100 or the receiving device 200 of FIG. 1, the transmitting device 100A or the receiving device 200A of FIG. 11, the transmitting device 300 or the receiving device 400 of FIG. 13, or the transmitting device 500 or the receiving device 600 of FIG. 14, and descriptions given above with reference to FIGS. 1 to 14 may also be applied to the present example embodiment.

The processing core 840 may include a single core processor or a multiple core processor. For example, the processing core 840 may include a general purpose processor, a central processing unit (CPU), a graphics processing unit (GPU), a digital signal processor (DSP), a microcontroller (MCU), a microprocessor, a network processor, an embedded processor, a field programmable gate array (FPGA), an application-specific instruction set processor (ASIP), an application-specific integrated circuit (ASIC) processor, etc. For example, the processing core 840 may be packaged as a common processor package, a multi-core processor package, a system-on-chip (SoC) package, a system-in-package (SiP) package, a system-on-package (SOP) package, etc.

The multi-mode DBI encoder 810 and the DBI mode selector 820 may be electrically connected to the processing core 840 through an internal data bus, and may receive the multi-bit data DATA under the control of the processing core 840. For example, the processing core 840 may transfer the multi-bit data DATA from an internal buffer memory to the multi-mode DBI encoder 810 and the DBI mode selector 820. The DBI mode selector 820 may select one multi-bit DBI signal DBI_MD from among a plurality of multi-bit DBI signals respectively corresponding to a plurality of DBI modes according to the multi-bit data DATA, and provide the selected multi-bit DBI signal DBI_MD to the multi-mode DBI encoder 810. The multi-mode DBI encoder 810 may generate encoded multi-bit data E_DATA by DBI encoding the multi-bit data DATA according to the multi-bit DBI signal DBI_MD. For example, the multi-mode DBI encoder 810 may include the multi-mode DBI encoder 110 of FIG. 1, and the DBI mode selector 820 may include the DBI mode selector 120 of FIG. 1.

The transceiver 830 may generate the data symbol D_SB having one from among a plurality of voltage levels from the encoded multi-bit data E_DATA by using a PAM scheme, and transmit the generated data symbol D_SB through the data channel DQ. Also, the transceiver 830 may generate the DBI symbol DBI_SB having one from among the voltage levels from the multi-bit DBI signal DBI_MD by using a PAM scheme, and transmit the generated DBI symbol DBI_SB through the DBI channel DBI_L. For example, the transceiver 830 may include the data transmitter 130 and the DBI transmitter 140 of FIG. 1.

Also, the transceiver 830 may receive the data symbol D_SB through the data channel DQ, and generate encoded multi-bit input data E_DATAi from the received data symbol D_SB. Also, the transceiver 830 may receive the DBI symbol DBI_SB through the DBI channel DBI_L and generate a multi-bit input DBI signal DBI_MDi from the received DBI symbol DBI_SB. For example, the transceiver 830 may include the data receiver 210 and the DBI receiver 220 of FIG. 1.

The multi-mode DBI decoder 850 may generate multi-bit input data DATAi by DBI decoding the encoded multi-bit input data E_DATAi, according to the multi-bit input DBI signal DBI_MDi. The multi-mode DBI decoder 850 may be electrically connected to the processing core 840 through an internal data bus. The multi-mode DBI decoder 850 may transmit the multi-bit input data DATAi to the internal buffer memory, and the processing core 840 may read the multi-bit input data DATAi by accessing the internal buffer memory. For example, the multi-mode DBI decoder 850 may include the multi-mode DBI decoder 230 of FIG. 1.

Figure 17:
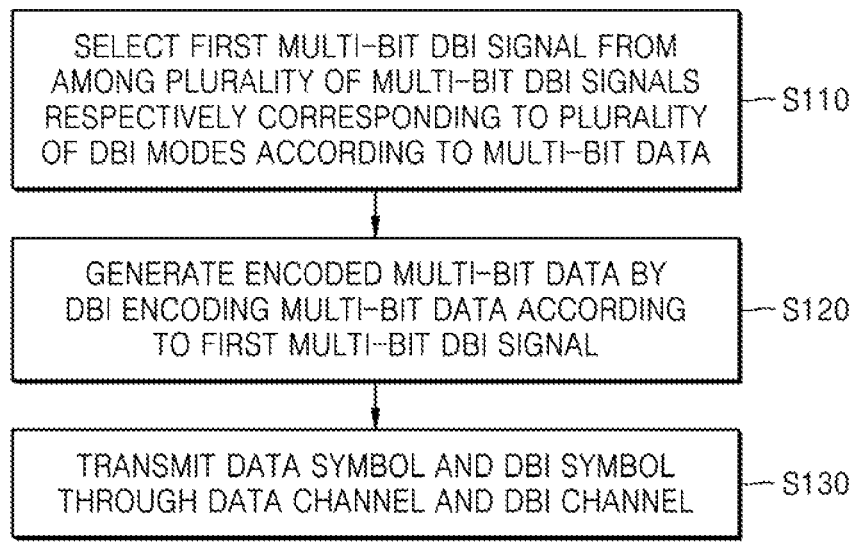
FIG. 17 is a flowchart of a data transmission method according to an example embodiment.

FIG. 17 is a flowchart of a data transmission method according to an example embodiment.

Referring to FIG. 17, the data transmission method according to the present example embodiment is a method of transmitting data through a memory interface like a data channel, and may be performed in the transmitting device 100 of FIG. 1, for example. The data transmission method according to the present example embodiment may also be performed in, for example, the transmitting device 100A of FIG. 11, the transmitting device 300 of FIG. 13, the transmitting device 500 of FIG. 14, and the memory device 700 of FIG. 15, or the data processing device 800 of FIG. 16. Descriptions given above with reference to FIGS. 1 to 16 may be applied to the present example embodiment.

In operation S110, the transmitting device 100 selects a first multi-bit DBI signal from among a plurality of multi-bit DBI signals respectively corresponding to a plurality of DBI modes according to multi-bit data. For example, the multi-bit data may be 2-bit data or 3-bit data, and the first multi-bit DBI signal may be a 2-bit signal or a 3-bit signal.

In operation S120, the transmitting device 100 generates encoded multi-bit data by DBI encoding the multi-bit data in a DBI mode selected from among the DBI modes according to the first multi-bit DBI signal. For example, the transmitting device 100 may generate the encoded multi-bit data by selectively inverting a plurality of bits included in the multi-bit data according to the first multi-bit DBI signal.

In operation S130, the transmitting device 100 transmits a data symbol and a DBI symbol through a data channel and a DBI channel, respectively. For example, the transmitting device 100 may generate a data symbol having one from among a plurality of voltage levels from the encoded multi-bit data by using a PAM scheme, and transmit the generated data symbol through the data channel. For example, the transmitting device 100 may generate a DBI symbol having one from among a plurality of voltage levels from the multi-bit DBI signal by using a PAM scheme, and transmit the generated DBI symbol through the DBI channel.

Figure 18:
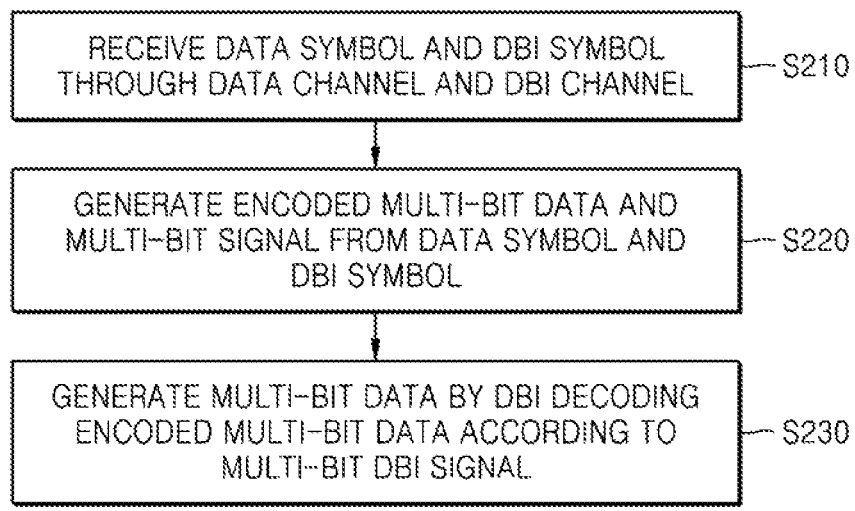
FIG. 18 is a flowchart of a data reception method according to an example embodiment.

FIG. 18 is a flowchart of a data reception method according to an example embodiment.

Referring to FIG. 18, the data reception method according to the present example embodiment is a method of receiving data through a memory interface like a data channel and may be performed in the receiving device 200 of FIG. 1, for example. The data reception method according to the present example embodiment may also be performed in, for example, the receiving device 200A of FIG. 11, the receiving device 400 of FIG. 13, the receiving device 600 of FIG. 14, and the memory device 700 of FIG. 15, or the data processing device 800 of FIG. 16. Descriptions given above with reference to FIGS. 1 to 16 may be applied to the present example embodiment.

In operation S210, the receiving device 200 receives a data symbol and a DBI symbol through a data channel and a DBI channel, respectively. For example, the receiving device 200 may receive a plurality of data symbols in parallel through a plurality of data channels, and the receiving device 200 may receive at least one DBI symbols through at least one DBI channels.

In operation S220, the receiving device 200 generates encoded multi-bit data and a multi-bit DBI signal from the data symbol and the DBI symbol, respectively. In detail, the receiving device 200 may generate encoded multi-bit data according to the voltage level of the data symbol by using a PAM scheme. Also, the receiving device 200 may generate a multi-bit DBI signal according to the voltage level of the DBI symbol by using a PAM scheme.

In operation S230, the receiving device 200 generates multi-bit data by DBI decoding the encoded multi-bit data in a DBI mode selected from among a plurality of DBI modes according to the multi-bit DBI signal. For example, the receiving device 200 may generate the multi-bit data by selectively inverting a plurality of bits included in the encoded multi-bit data according to the multi-bit DBI signal.

Figure 19:
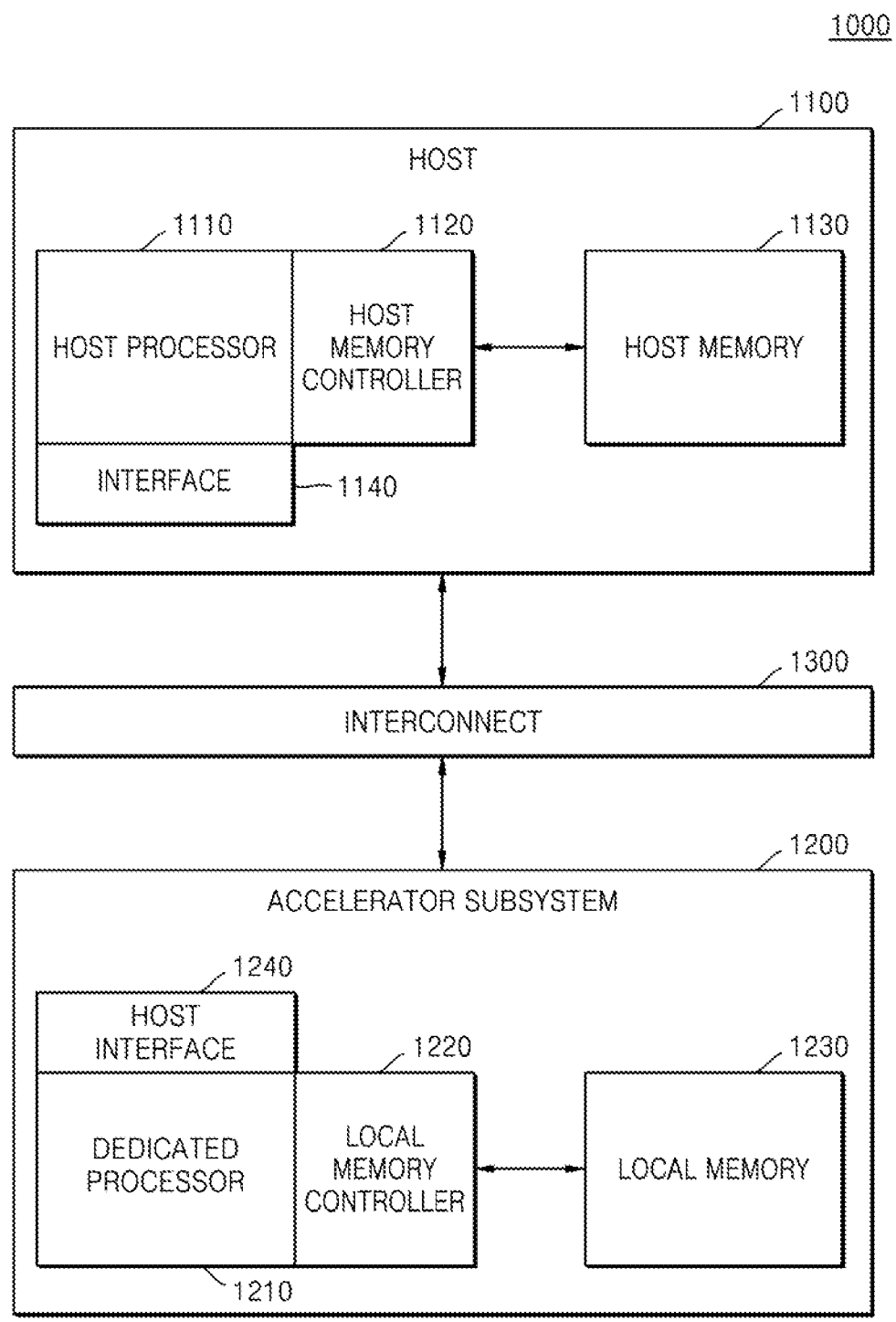
FIG. 19 is a block diagram showing a computing system according to an example embodiment.

FIG. 19 is a block diagram showing a computing system 1000 according to an example embodiment.

Referring to FIG. 19, the computing system 1000 may be implemented as a single electronic device or distributed over two or more electronic devices. For example, the computing system 1000 may be implemented as at least one from among various electronic devices like a desktop computer, a laptop computer, a tablet computer, a smartphone, an autonomous vehicle, a digital camera, a wearable device, a healthcare device, a server system, a data center, a drone, a handheld game console, an Internet of Things (IoT) device, etc.

The computing system 1000 may include a host 1100, an accelerator sub-system 1200, and an interconnect 1300. The host 1100 may control the overall operation of the accelerator sub-system 1200, and the accelerator sub-system 1200 may operate under the control of the host 1100. The host 1100 and the accelerator sub-system 1200 may be connected to each other through the interconnect 1300. Various signals and data may be transmitted and received between the host 1100 and the accelerator sub-system 1200 through the interconnect 1300.

The host 1100 may include a host processor 1110, a host memory controller 1120, a host memory 1130, and an interface 1140. The host processor 1110 may control the overall operation of the computing system 1000. The host processor 1110 may control the host memory 1130 through the host memory controller 1120. For example, the host processor 1110 may read data from the host memory 1130 or write data to the host memory 1130. The host processor 1110 may control the accelerator sub-system 1200 connected through the interconnect 1300. For example, the host processor 1110 may transmit a command to the accelerator sub-system 1200 to allocate a task to the accelerator sub-system 1200.

The host processor 1110 may be a general-purpose processor or a main processor that performs general calculations related to various operations of the computing system 1000. For example, the host processor 1110 may be a central processing unit (CPU) or an application processor (AP).

The host memory 1130 may be a main memory of the computing system 1000. The host memory 1130 may store data processed by the host processor 1110 or may store data received from the accelerator sub-system 1200. For example, the host memory 1130 may include a DRAM. In another implementation, and the host memory 1130 may include at least one of a volatile memory like an SRAM and a non-volatile memory like a flash memory, a PRAM, an RRAM, and an MRAM.

In an example embodiment, the host processor 1110 and the host memory 1130 may communicate with each other through a plurality of data channels and at least one DBI channels. Data symbols corresponding to multi-bit data may be transmitted and received through a plurality of data channels, respectively. Also, through the DBI channel, a DBI symbol corresponding to a multi-bit DBI signal indicating one from among a plurality of DBI modes may be transmitted and received. In this case, the multi-bit data may be DBI encoded according to the multi-bit DBI signal. The host processor 1110 and the host memory 1130 may be implemented with reference to the embodiments shown in FIGS. 1 to 18.

The interface 1140 may be configured such that the host 1100 communicates with the accelerator sub-system 1200 therethrough. The host processor 1110 may transmit control signals and data to the accelerator sub-system 1200, and receive signals and data from the accelerator sub-system 1200 through the interface 1140. In an example embodiment, the host processor 1110, the host memory controller 1120, and the interface 1140 may be implemented as a single chip.

The accelerator sub-system 1200 may perform a particular function under the control of the host 1100. For example, the accelerator sub-system 1200 may perform calculations specialized for a particular application under the control of the host 1100. The accelerator sub-system 1200 may be implemented in one of various forms like a module, a card, a package, a chip, or a device that may be physically or electrically connected to the host 1100 or connected to the host 1100 via a wire or wirelessly. For example, the accelerator sub-system 1200 may be implemented as a graphics card or an accelerator card. For example, the accelerator sub-system 1200 may be implemented based on a field programmable gate array (FPGA) or an application specific integrated circuit (ASIC).

In an example embodiment, the accelerator sub-system 1200 may be implemented based on one of various packaging techniques. For example, the accelerator sub-system 1200 may be implemented by using packaging technique like ball grid arrays (BGAs), a multi chip package (MCP), a system on package (SOP), a system in package (SIP), a package on package (POP), chip scale packages (CSPs), a wafer level package (WLP), or a panel level package (PLP). As an example, some or all components of the accelerator sub-system 1200 may be connected through copper-to-copper bonding. For example, some or all components of the accelerator sub-system 1200 may be connected through an interposer like a silicon interposer, an organic interposer, a glass interposer, or an active interposer. For example, when some or all components of the accelerator sub-system 1200 are stacked, the components may be stacked based on a through silicon via (TSV). For example, some or all components of the accelerator sub-system 1200 may be connected through a high-speed connection passage (e.g., a silicon bridge).

The accelerator sub-system 1200 may include a dedicated processor 1210, a local memory controller 1220, a local memory 1230, and a host interface 1240. The dedicated processor 1210 may operate under the control of the host processor 1110. For example, the dedicated processor 1210 may read data from the local memory 1230 through the local memory controller 1220 in response to a command of the host processor 1110. The dedicated processor 1210 may process data by performing a calculation based on the read data. The dedicated processor 1210 may transmit processed data to the host processor 1110 or may write the processed data to the local memory 1230.

The dedicated processor 1210 may perform calculations specialized for a particular application based on values stored in the local memory 1230. For example, the dedicated processor 1210 may perform calculations specialized for applications like artificial intelligence, streaming analysis, video transcoding, data indexing, data encoding/decoding, and data encryption. Therefore, the dedicated processor 1210 may process various types of data like image data, voice data, motion data, biometric data, and key values. For example, the dedicated processor 1210 may include at least one of a graphic processing unit (GPU), a neural processing unit (NPU), a tensor processing unit (TPU), a vision processing unit (VPU), an image signal processor (ISP), and a digital signal processor (DSP).

The dedicated processor 1210 may include one processor core or may include a plurality of processor cores like a dual core, a quad core, and a hexa core. In an example embodiment, the dedicated processor 1210 may include a larger number of cores than the host processor 1110 for calculation specialized in parallelism. For example, the dedicated processor 1210 may include one thousand or more cores. In this case, the cores may process data with little or no dependency on one another in parallel.

In an example embodiment, the dedicated processor 1210 may be a processor specialized in an image data calculation. In this case, the dedicated processor 1210 may perform a calculation by reading image data stored in the local memory 1230 through the local memory controller 1220. The dedicated processor 1210 may transmit a calculation result to the host processor 1110 or may store the calculation result in the local memory 1230. The host processor 1110 may store the transmitted calculation result in the host memory 1130 or a frame buffer allocated to a separate memory. Data stored in the frame buffer may be transmitted to a separate display device.

In an example embodiment, the dedicated processor 1210 may be a processor specialized in a neural network-based training calculation and an inference calculation. The dedicated processor 1210 may read neural network parameters (e.g., neural network model parameters, weights, biases, etc.) from the local memory 1230 to perform a training calculation or an inference calculation. The neural network parameters may be values provided from the host processor 1110, values processed by the dedicated processor 1210, or previously stored values. For example, the host processor 1110 may provide weight parameters for an inference calculation to the dedicated processor 1210. In this case, the weight parameters may be parameters updated through a training calculation of the host processor 1110. The dedicated processor 1210 may perform training or inference based on neural network parameters of the local memory 1230 through a matrix product calculation and a cumulative calculation. The dedicated processor 1210 may transmit a calculation result to the host processor 1110 or may store the calculation result in the local memory 1230.

The local memory controller 1220 may control the overall operation of the local memory 1230. In an example embodiment, the local memory controller 1220 may process data to be stored in the local memory 1230 and write the processed data to the local memory 1230. In another implementation, the local memory controller 1220 may process data read from the local memory 1230. For example, the local memory controller 1220 may perform error correction code (ECC) encoding and ECC decoding, or perform data encryption and data decryption.

The local memory 1230 may be used exclusively by the dedicated processor 1210.

The local memory 1230 may include a DRAM, for example. As another example, the local memory 1230 may include at least one of a volatile memory like an SRAM and an non-volatile memory like a flash memory, a PRAM, an RRAM, and an MRAM. The local memory 1230 may be formed, for example, in various forms like a die, a chip, a package module, a card, and a device to be mounted on a single substrate with the dedicated processor 1210 or to be connected to the dedicated processor 1210 based on a separate connector.

In an example embodiment, the local memory 1230 may have a structure including 32 or more data pins. For example, local memory 1230 may include 1024 or more data pins to provide a wide bandwidth. In an example embodiment, the bus width per chip of the local memory 1230 may be larger than the bus width per chip of the host memory 1130.

In an example embodiment, the local memory 1230 may operate based on a graphics double data rate (GDDR) memory, a high bandwidth memory (HBM), a hybrid memory cube (HMC), or a wide I/O interface. However, the local memory 1230 may operate based on various standard interfaces.

In an example embodiment, the local memory 1230 may include a logic circuit capable of performing calculations. The logic circuit may perform linear calculations, comparison calculations, compression calculations, data conversion calculations, arithmetic calculations, etc., on data read from the local memory 1230 or data to be written to the local memory 1230. Accordingly, the size of data processed by the logic circuit may be reduced. When the size of data is reduced, the efficiency of the bandwidth between the local memory 1230 and the local memory controller 1220 may be improved.

In an example embodiment, the dedicated processor 1210 and the local memory 1230 may communicate with each other through a plurality of data channels and at least one DBI channel. Data symbols corresponding to multi-bit data may be transmitted and received through a plurality of data channels, respectively. Also, through the DBI channel, a DBI symbol corresponding to a multi-bit DBI signal indicating one from among a plurality of DBI modes may be transmitted and received. In this case, the multi-bit data may be DBI encoded according to the multi-bit DBI signal. The dedicated processor 1210 and the local memory 1230 may be implemented with reference to the embodiments shown in FIGS. 1 to 18.

The host interface 1240 may be configured such that the accelerator sub-system 1200 communicates with the host 1100 therethrough. The accelerator sub-system 1200 may transmit signals and data to the host 1100, and receive control signals and data from the host 1100 through the host interface 1240. In an example embodiment, the dedicated processor 1210, the local memory controller 1220, and the host interface 1240 may be implemented as a single chip.

The interconnect 1300 may provide a data transmission path between the host 1100 and the accelerator sub-system 1200, and serve as a data bus or a data link. The data transmission path may be formed via a wire or wirelessly. The interface 1140 and the host interface 1240 may communicate with each other based on a predetermined protocol through the interconnect 1300. For example, the interface 1140 and the host interface 1240 may communicate with each other based on one of various standard protocols like advanced technology attachment (ATA), serial ATA (ATA), external SATA (e-SATA), small computer small interface (SCSI), serial attached SCSI (SAS), peripheral component interconnection (PCI), PCI express (PCIe), NVM express (NVMe), advanced extensible interface (AXI), ARM microcontroller bus architecture (AMBA), IEEE 1394, universal serial bus (USB), or protocols for a secure digital (SD) card, a multi-media card (MMC), an embedded multi-media card (eMMC), universal flash storage (UFS), a compact flash (CF), and Gen-Z. In an example embodiment, the interface 1140 and the host interface 1240 may communicate with each other based on an inter-device communication link like coherent accelerator processor interface (openCAPI), cache coherent interconnect for accelerators (CCIX), compute express link (CXL), and NVLINK. In an example embodiment, the interface 1140 and the host interface 1240 may communicate with each other based on a wireless communication technique like LTE, 5G, LTE-M, NB-IoT, LPWAN, Bluetooth, near field communication (NFC), Zigbee, Z-Wave, and WLAN.

In an example embodiment, the accelerator sub-system 1200 may further include a sensor capable of detecting image data, voice data, motion data, biometric data, and surrounding environment information. In an example embodiment, when a sensor is included in the accelerator sub-system 1200, the sensor may be connected to other components (e.g., the dedicated processor 1210 and the local memory 1230) based on the above-described packaging technique. The accelerator sub-system 1200 may process data sensed through a sensor based on particular calculations.

Although FIG. 19 shows that the dedicated processor 1210 uses one local memory 1230 through one local memory controller 1220, the dedicated processor 1210 may use a plurality of local memories through the one local memory controller 1220. In another example embodiment, the dedicated processor 1210 may use local memories respectively corresponding to a plurality of local memory controllers.

The embodiments described above with reference to FIGS. 1 to 19 may be applied to graphics double data rate type six synchronous dynamic random-access memory (GDDR6) or graphics double data rate type seven synchronous dynamic random-access memory (GDDR7).

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A data processing device, comprising:
   a data bus inversion (DBI) mode selector configured to receive multi-bit data and select a first multi-bit DBI signal from among a plurality of multi-bit DBI signals respectively corresponding to a plurality of DBI modes according to the multi-bit data;
   a multi-mode DBI encoder configured to generate encoded multi-bit data by DBI encoding the multi-bit data according to the first multi-bit DBI signal; and
   a transceiver configured to:
   generate a data symbol having a voltage level from among first to m voltage levels corresponding to the encoded multi-bit data, using a pulse amplitude modulation (PAM)-m scheme, and generate a DBI symbol having a voltage level from among first to n voltage levels corresponding to the first multi-bit DBI signal using a PAM-n scheme, wherein the m and the n are greater than 2; and
   transmit the data symbol through a data channel and transmit the DBI symbol through a DBI channel.

2. The data processing device as claimed in claim 1, wherein:
   the multi-bit data includes 2-bit data, and
   each of the plurality of multi-bit DBI signals includes a 2-bit signal.

3. The data processing device as claimed in claim 2, wherein the plurality of DBI modes include:
   a first DBI mode in which all bits of the 2-bit data are not inverted;
   a second DBI mode in which only a least significant bit (LSB) of the 2-bit data is inverted;
   a third DBI mode in which only a most significant bit (MSB) of the 2-bit data is inverted; and
   a fourth DBI mode in which all bits of the 2-bit data are inverted.

4. The data processing device as claimed in claim 2, wherein the m and the n are equal to 4, and
   wherein the transceiver includes:
   a data transceiver configured to generate the data symbol having one voltage level from among first to fourth voltage levels, from the 2-bit data by using a pulse amplitude modulation (PAM)-4 scheme; and
   a DBI transceiver configured to generate the DBI symbol having one voltage level from among the first to fourth voltage levels, from the first multi-bit DBI signal by using the PAM-4 scheme.

5. The data processing device as claimed in claim 1, wherein the m and the n are equal to 8, and
   wherein:
   the multi-bit data includes 3-bit data,
   each of the plurality of multi-bit DBI signals includes a 3-bit signal, and the transceiver includes:
- a data transceiver configured to generate the data symbol having one voltage level from among first to eighth voltage levels, from the 3-bit data by using a pulse amplitude modulation (PAM)-8 scheme; and
- a DBI transceiver configured to generate the DBI symbol having one voltage level from among the first to eighth voltage levels, from the first multi-bit DBI signal by using the PAM-8 scheme.

6. The data processing device as claimed in claim 1, wherein the DBI mode selector is further configured to select the first multi-bit DBI signal such that a transmission consumption current for transmitting the data symbol is minimized.

7. The data processing device as claimed in claim 1, wherein:
the data channel includes a plurality of data channels,
the multi-mode DBI encoder includes a plurality of multi-mode DBI encoders configured to generate a plurality of pieces of encoded multi-bit data by DBI encoding a plurality of pieces of multi-bit data, respectively, according to the first multi-bit DBI signal, and
the transceiver includes a plurality of data transceivers configured to transmit a plurality of data symbols corresponding to the encoded multi-bit data through the plurality of data channels, respectively.

8. The data processing device as claimed in claim 7, wherein the DBI mode selector is further configured to count a number of each of a plurality of data patterns in the multi-bit data, and, based on the counted numbers, select the first multi-bit DBI signal such that a transmission consumption current for transmitting the plurality of data symbols is minimized.

9. The data processing device as claimed in claim 7, wherein:
the DBI mode selector includes:
- a first DBI mode selector configured to select the first multi-bit DBI signal from among the plurality of multi-bit DBI signals, according to a data pattern of first multi-bit data from among the multi-bit data; and
- a second DBI mode selector configured to select a second multi-bit DBI signal from among the plurality of multi-bit DBI signals, according to a data pattern of second multi-bit data from among the multi-bit data, and the plurality of multi-mode DBI encoders include:
- a first multi-mode DBI encoder configured to generate first encoded multi-bit data by DBI encoding the first multi-bit data, according to the first multi-bit DBI signal; and
- a second multi-mode DBI encoder configured to generate second encoded multi-bit data by DBI encoding the second multi-bit data, according to the first multi-bit DBI signal.

10. The data processing device as claimed in claim 9, wherein the transceiver further includes:
a first DBI transceiver configured to transmit a first DBI symbol corresponding to the first multi-bit DBI signal through a first DBI channel; and
a second DBI transceiver configured to transmit a second DBI symbol corresponding to the second multi-bit DBI signal through a second DBI channel.

11. The data processing device as claimed in claim 1, further comprising a multi-mode DBI decoder, wherein:

the transceiver is further configured to receive an input data symbol through the data channel and receive an input DBI symbol through the DBI channel, and
the multi-mode DBI decoder is configured to generate multi-bit input data by DBI decoding encoded multi-bit input data corresponding to the input data symbol, according to a multi-bit input DBI signal corresponding to the DBI input symbol.

12. The data processing device as claimed in claim 1, further comprising a processing core electrically connected to the DBI mode selector and the multi-mode DBI encoder.

13. A data processing device, comprising:
a transceiver configured to receive a data symbol and a data bus inversion (DBI) symbol through a data channel and a DBI channel, respectively, the data symbol having a voltage level from among first to m voltage levels corresponding to the encoded multi-bit data, and the DBI symbol having a voltage level from among first to n voltage levels corresponding to a multi-bit DBI signal, wherein the m and the n are greater than 2, generate encoded multi-bit data from the received data symbol, and generate a multi-bit DBI signal from the received DBI symbol; and
a multi-mode DBI decoder configured to generate multi-bit data by DBI decoding the encoded multi-bit data according to the multi-bit DBI signal.

14. The data processing device as claimed in claim 13, wherein:
the multi-bit data includes 2-bit data, and
the multi-bit DBI signal includes a 2-bit signal.

15. The data processing device as claimed in claim 14, wherein the multi-bit DBI signal represents one of a plurality of DBI modes, the plurality of DBI modes including:
a first DBI mode in which all bits of the 2-bit data are not inverted;
a second DBI mode in which only a least significant bit (LSB) of the 2-bit data is inverted;
a third DBI mode in which only a most significant bit (MSB) of the 2-bit data is inverted; and
a fourth DBI mode in which all bits of the 2-bit data are inverted.

16. The data processing device as claimed in claim 14, wherein the m and the n are equal to 4, and
wherein the transceiver includes:
- a data transceiver configured to generate the encoded multi-bit data from the data symbol having one voltage level from among first to eighth voltage levels by using a pulse amplitude modulation (PAM)-4 scheme; and
- a DBI transceiver configured to generate the multi-bit DBI signal from the DBI symbol having one voltage level from among the first to fourth voltage levels by using the PAM-4 scheme.

17. The data processing device as claimed in claim 13, wherein:
the data channel includes a plurality of data channels,
the transceiver includes a plurality of data transceivers configured to receive a plurality of data symbols through the plurality of data channels and generate a plurality of pieces of encoded multi-bit data from the received data symbols, and
the multi-mode DBI decoder includes a plurality of multi-mode DBI decoders configured to generate a plurality of pieces of multi-bit data by DBI decoding the encoded multi-bit data, respectively, according to the multi-bit DBI signal.

18. The data processing device as claimed in claim 13, wherein:

the data channel includes a plurality of data channels,
the DBI channel includes a first DBI channel and a second DBI channel,
the transceiver includes:
- a plurality of data transceivers configured to receive a plurality of data symbols including first and second data symbols through the plurality of data channels and generate encoded first and second multi-bit data from the received first and second data symbols, respectively;
- a first DBI transceiver configured to receive a first DBI symbol through the first DBI channel and generate a first multi-bit DBI signal from the received first DBI symbol; and
- a second DBI transceiver configured to receive a second DBI symbol through the second DBI channel and generate a second multi-bit DBI signal from the received second DBI symbol, and the multi-mode DBI decoder includes:
- a first multi-mode DBI decoder configured to generate first multi-bit data by DBI decoding the encoded first multi-bit data according to the first multi-bit DBI signal; and
- a second multi-mode DBI decoder configured to generate second multi-bit data by DBI decoding the encoded second multi-bit data according to the second multi-bit DBI signal.

19. The data processing device as claimed in claim 13, further comprising a processing core electrically connected to the multi-mode DBI decoder.

20. A memory system, comprising:
a transmitting device having:
- a data bus inversion (DBI) mode selector circuit configured to receive multi-bit data and select a first multi-bit DBI signal from among a plurality of multi-bit DBI signals respectively corresponding to a plurality of DBI modes according to the multi-bit data;
- a multi-mode DMI encoder circuit configured to generate encoded multi-bit data by DBI encoding the multi-bit data according to the first multi-bit DBI signal; and
- a transmitter circuit configured to:
  generate a data symbol having a voltage level from among first to m voltage levels corresponding to the encoded multi-bit data, using a pulse amplitude modulation (PAM)-m scheme, and generate a DBI symbol having a voltage level from among first to n voltage levels corresponding to the first multi-bit DBI signal using the PAM-n scheme, wherein the m and the n are greater than 2; and
  transmit the data symbol through a data channel and the DBI symbol through a DBI channel; and
a receiving device having:
- a receiver circuit configured to receive the data symbol and the DBI symbol through the data channel and the DBI channel, respectively, generate the encoded multi-bit data from the received data symbol, and generate a multi-bit DBI signal from the received DBI symbol; and
- a multi-mode DBI decoder circuit configured to generate multi-bit data by DBI decoding the encoded multi-bit data according to the multi-bit DBI signal.

\* \* \* \* \*